US011526072B2

(12) United States Patent
Kaji et al.

(10) Patent No.: US 11,526,072 B2
(45) Date of Patent: Dec. 13, 2022

(54) INFORMATION PROCESSING APPARATUS AND METHOD, AND PROJECTION IMAGING APPARATUS AND INFORMATION PROCESSING METHOD

(71) Applicant: SONY CORPORATION, Tokyo (JP)

(72) Inventors: Yohsuke Kaji, Chiba (JP); Naoki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 189 days.

(21) Appl. No.: 16/942,220

(22) Filed: Jul. 29, 2020

(65) Prior Publication Data

US 2020/0355994 A1    Nov. 12, 2020

Related U.S. Application Data

(63) Continuation of application No. 15/573,050, filed as application No. PCT/JP2016/068753 on Jun. 24, 2016, now Pat. No. 10,802,384.

(30) Foreign Application Priority Data

Jul. 8, 2015  (JP) .................................. 2015-136727

(51) Int. Cl.
*G03B 21/20* (2006.01)
*G06F 3/14* (2006.01)
(Continued)

(52) U.S. Cl.
CPC ..... *G03B 21/2033* (2013.01); *G02B 27/0025* (2013.01); *G02B 27/0068* (2013.01);
(Continued)

(58) Field of Classification Search
None
See application file for complete search history.

(56) References Cited

U.S. PATENT DOCUMENTS

2006/0158623 A1  7/2006  Kobayashi et al.
2009/0115916 A1  5/2009  Kondo et al.
(Continued)

FOREIGN PATENT DOCUMENTS

JP    2005-079939 A    3/2005
JP    2005-229282 A    8/2005
(Continued)

OTHER PUBLICATIONS

Raskar, et al., "The Office of the Future: A Unified Approach to Image-Based Modeling and Spatially Immersive Displays", Computer Graphics Proceedings, Annual Conference Series, SIGGRAPH 98, Jul. 19-24, 1998, pp. 1-10, Orlando, Florida.

*Primary Examiner* — Bao-Luan Q Le
*Assistant Examiner* — Danell L Owens
(74) *Attorney, Agent, or Firm* — Paratus Law Group, PLLC

(57) ABSTRACT

There is provided an information processing apparatus and method, and a projection imaging apparatus and an information processing method capable of suppressing an increase in processing amount of processing related to update of correction information used for geometric correction and the like, the information processing apparatus detecting, in regard to projection imaging apparatuses each having a projection unit that projects an image on a projection surface and an imaging unit that images the projection surface, a corresponding point between a pixel of the projection unit and a pixel of the imaging unit for a relation between one of the projection imaging apparatuses whose posture has changed and one of the projection imaging apparatuses whose posture has not changed, and estimating a relative posture of the projection imaging apparatus whose posture has changed with respect to the projection imaging apparatus whose posture has not changed.

16 Claims, 19 Drawing Sheets

(51) Int. Cl.
    *G02B 27/00*     (2006.01)
    *G09G 3/00*     (2006.01)
    *H04N 9/31*     (2006.01)
    *H04N 5/74*     (2006.01)
    *G09G 5/00*     (2006.01)

(52) U.S. Cl.
    CPC ........... *G06F 3/1446* (2013.01); *G09G 3/002* (2013.01); *G09G 5/00* (2013.01); *H04N 5/74* (2013.01); *H04N 9/31* (2013.01); *H04N 9/3147* (2013.01); *H04N 9/3185* (2013.01); *H04N 9/3194* (2013.01); *G09G 2320/0693* (2013.01); *G09G 2340/0464* (2013.01); *G09G 2340/0471* (2013.01); *G09G 2340/0478* (2013.01)

(56) References Cited

U.S. PATENT DOCUMENTS

| | | |
|---|---|---|
| 2015/0208019 A1 | 7/2015 | Stewart et al. |
| 2016/0140714 A1* | 5/2016 | Hara .................... H04N 9/3185 348/189 |

FOREIGN PATENT DOCUMENTS

| | | |
|---|---|---|
| JP | 2007-295375 A | 11/2007 |
| JP | 2009-290412 A | 12/2009 |
| JP | 2011-170174 A | 9/2011 |
| JP | 2012-173378 A | 9/2012 |

* cited by examiner

FIG. 7

| DEFINITION OF CHANGE FACTOR | DETECTION OF CORRESPONDING POINT | POSTURE ESTIMATION | SHAPE ESTIMATION FOR PROJECTION SURFACE |
|---|---|---|---|
| INITIAL SENSING | PROCESSED FOR ALL | PROCESSED FOR ALL | PROCESSED FOR ALL |
| POSTURE CHANGE IN ALL PROJECTION IMAGING APPARATUSES | PROCESSED FOR ALL | PROCESSED FOR ALL | PROCESSED FOR ALL |
| POSTURE CHANGE IN PART OF PROJECTION IMAGING APPARATUSES | ONLY FOR PART RELATED TO PROJECTION IMAGING APPARATUS WHOSE POSTURE HAS CHANGED | ONLY FOR PROJECTION IMAGING APPARATUS WHOSE POSTURE HAS CHANGED | ONLY FOR UNKNOWN PART |
| SHAPE CHANGE IN PROJECTION SURFACE | ONLY FOR PART RELATED TO PROJECTION IMAGING APPARATUS WHOSE CORRESPONDING POINT HAS CHANGED | UNNECESSARY | ONLY FOR UNKNOWN PART |
| POSTURE CHANGE IN PART OF PROJECTION IMAGING APPARATUSES AND SHAPE CHANGE IN PROJECTION SURFACE | ONLY FOR PART RELATED TO PROJECTION IMAGING APPARATUSES WHOSE POSTURE HAS CHANGED AND PART RELATED TO PROJECTION IMAGING APPARATUS WHOSE CORRESPONDING POINT HAS CHANGED | ONLY FOR PROJECTION IMAGING APPARATUS WHOSE POSTURE HAS CHANGED | ONLY FOR UNKNOWN PART |

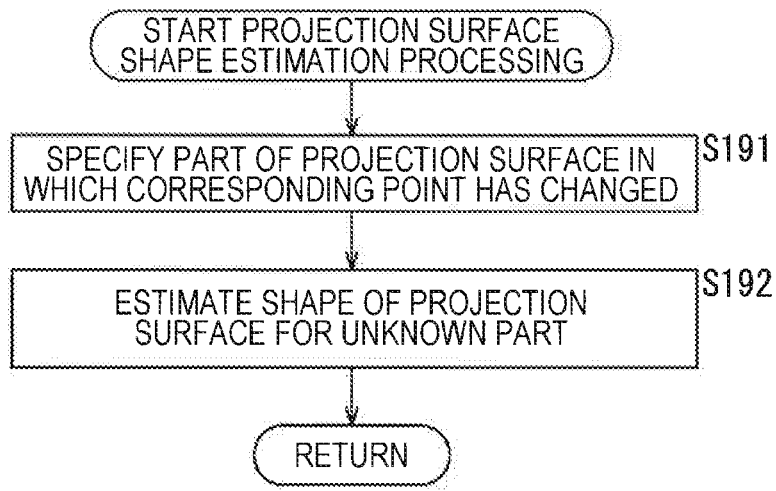
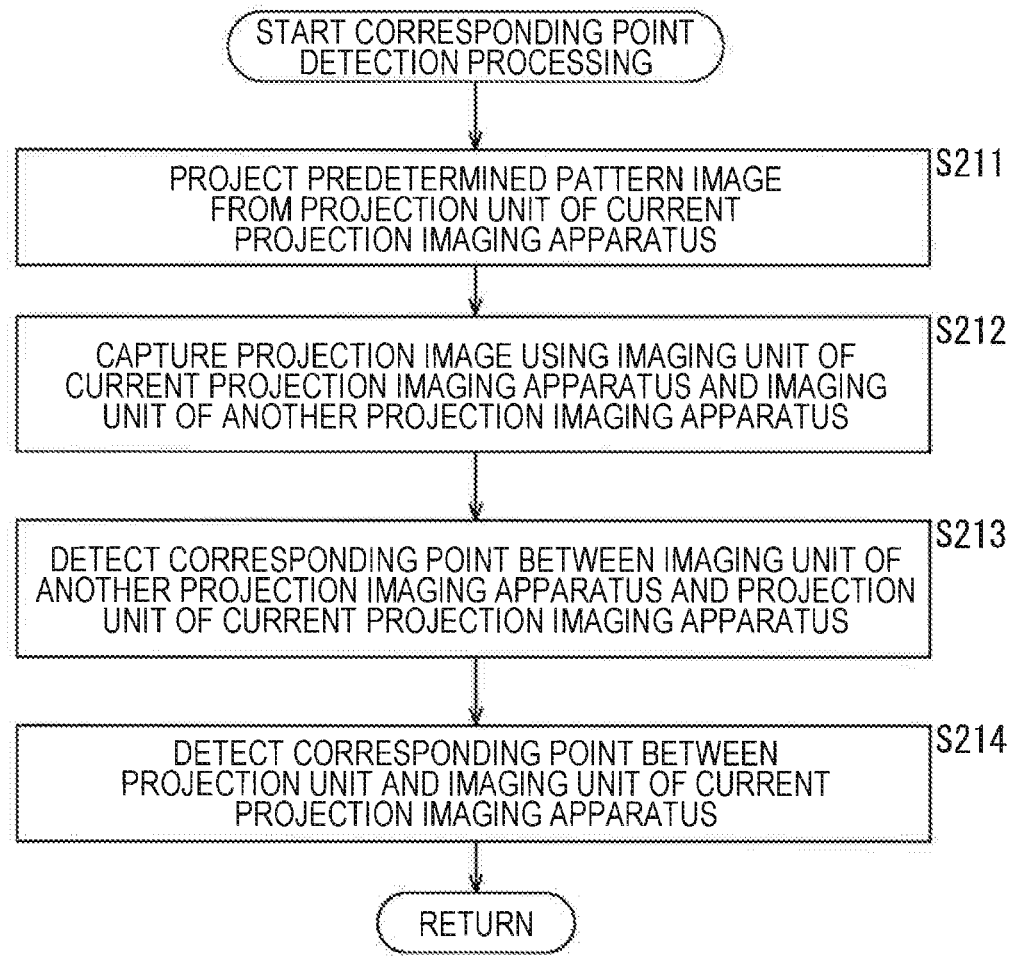

INFORMATION PROCESSING APPARATUS AND METHOD, AND PROJECTION IMAGING APPARATUS AND INFORMATION PROCESSING METHOD

CROSS REFERENCE TO RELATED APPLICATIONS

This application is a continuation of U.S. patent application Ser. No. 15/573,050 (filed on Nov. 9, 2017), which is a National Stage Patent Application of PCT International Patent Application No. PCT/JP2016/068753 (filed on Jun. 24, 2016) under 35 U.S.C. § 371, which claims priority to Japanese Patent Application No. 2015-136727 (filed on Jul. 8, 2015), which are all hereby incorporated by reference in their entirety.

TECHNICAL FIELD

The present technology relates to an information processing apparatus and method, and a projection imaging apparatus and an information processing method, and more particularly, to an information processing apparatus and method, and a projection imaging apparatus and an information processing method capable of suppressing an increase in processing amount of processing related to update of correction information used for geometric correction and the like.

BACKGROUND ART

Conventionally, there has been a technology such as so-called projection mapping or the like in which images are projected by causing a plurality of projectors to collaborate. For example, there has been a method of projecting images using a plurality of projectors to form a single projection image as a whole. In such a case, in order to appropriately combine the projection images projected by the respective projectors without giving any sense of incompatibility and form one projection image, correction processing such as position alignment and geometric correction have been performed on each image to be projected. How to correct has been set according to the posture of the projector (position (translation component) and direction (rotation component)), the shape of a projection surface, and so on.

There has been a method of estimating the posture of the projector and the shape of the projection surface using a camera that captures a projection image projected by the projector to obtain a captured image. Estimation of the shape of the projection surface and estimation of the posture of each projector have been enabled using the projected image and the captured image on the basis of a correspondence relationship of pixels between the projector and the camera and a relative positional relationship between the projector and the camera.

However, there has been a possibility that the posture of the projector and the shape of the projection surface change even during the projection of an image such as contents. Then, in a case where such a change occurs, it has been necessary to re-estimate these elements and to set up again how to correct (to update setting information indicating how to set these elements). That is, it has been necessary to find the correspondence relationship of pixels between the projector and the camera and to estimate the posture of the projector and the shape of the projection surface using this correspondence relationship.

For example, as online sensing which is a technology for finding the correspondence relationship of pixels while an image such as contents is being projected, a technique of embedding a gray code in a projection image (for example, refer to Non-Patent Document 1), a technique utilizing an image feature amount such as SIFT, and a technique utilizing invisible light such as infrared light (Infrared) have been proposed.

CITATION LIST

Non-Patent Document

Non-Patent Document 1: Imperceptible Structured Light Ramesh Raskar, SIGGRAPH 98

SUMMARY OF THE INVENTION

Problems to be Solved by the Invention

However, in any case of these methods, correction information has been updated for all the projectors. That is, as described above, all items of processing such as the calculation of a pixel correspondence relationship, the posture estimation for the projector, and the shape estimation for the projection surface have been performed for all the projectors. For example, even in a case where the postures of some projectors have changed, all of these items of the processing have been performed for all the projectors. Therefore, there has been a risk that the processing amount of processing related to the update of the correction information used for geometric correction and the like increases and the processing time increases.

The present technology has been proposed by taking such a situation in consideration and an object thereof is to suppress an increase in processing amount of processing related to update of correction information used for geometric correction and the like.

Solutions to Problems

An information processing apparatus according to the present technology is an information processing apparatus including a corresponding point detection unit that detects, in regard to projection imaging apparatuses each having a projection unit that projects an image on a projection surface and an imaging unit that images the projection surface, a corresponding point between a pixel of the projection unit and a pixel of the imaging unit for a relation between one of the projection imaging apparatuses whose posture has changed and one of the projection imaging apparatuses whose posture has not changed; and a relative posture estimation unit that estimates a relative posture of the projection imaging apparatus whose posture has changed with respect to the projection imaging apparatus whose posture has not changed on the basis of the corresponding point between a pixel of the projection unit and a pixel of the imaging unit detected by the corresponding point detection unit for a relation between the projection imaging apparatus whose posture has changed and the projection imaging apparatus whose posture has not changed.

The corresponding point detection unit can detect a corresponding point between a pixel of the projection unit of the projection imaging apparatus whose posture has not changed and a pixel of the imaging unit of the projection imaging apparatus whose posture has changed.

The corresponding point detection unit can detect a corresponding point between a pixel of the projection unit of the projection imaging apparatus whose posture has changed and a pixel of the imaging unit of the projection imaging apparatus whose posture has not changed.

A corresponding point change detection unit that detects a change in a corresponding point between a pixel of the projection unit and a pixel of the imaging unit of the projection imaging apparatuses; a posture change detection unit that detects a posture change in each projection imaging apparatus on the basis of a sensor output from a sensor unit which is included in each projection imaging apparatus and detects at least one of a position and a direction; and a change determination unit that determines whether a posture of each projection imaging apparatus has changed on the basis of a detection result of the corresponding point change detection unit and a detection result of the posture change detection unit can be further included, in which the corresponding point detection unit can be configured to detect the corresponding point between one of the projection imaging apparatuses whose posture is determined by the change determination unit to have changed and one of the projection imaging apparatuses whose posture is determined by the change determination unit to have not changed, and the relative posture estimation unit can be configured to estimate a relative posture of the projection imaging apparatus whose posture is determined by the change determination unit to have changed with respect to the projection imaging apparatus whose posture is determined by the change determination unit to have not changed.

The corresponding point detection unit can be configured to further detect a corresponding point between a pixel of the projection unit and a pixel of the imaging unit of the projection imaging apparatus whose posture has changed, and a projection surface shape estimation unit that estimates a shape of the projection surface on the basis of the corresponding point detected by the corresponding point detection unit for a relation between a pixel of the projection unit and a pixel of the imaging unit of the projection imaging apparatus whose posture has changed can be further included.

The corresponding point detection unit can be configured to further detect a corresponding point between a pixel of the projection unit and a pixel of the imaging unit of the projection imaging apparatus whose posture has not changed, and a projection surface shape estimation unit that estimates a shape of the projection surface on the basis of the corresponding point detected by the corresponding point detection unit for a relation between a pixel of the projection unit and a pixel of the imaging unit of the projection imaging apparatus whose posture has not changed can be further included.

The projection surface shape estimation unit can estimate a shape of the projection surface for a part of the projection surface whose shape is unknown within a range on which an image is projected by the projection unit of the projection imaging apparatus whose posture has changed.

An information processing method according to the present technology is an information processing method configured to detect, in regard to projection imaging apparatuses each having a projection unit that projects an image on a projection surface and an imaging unit that images the projection surface, a corresponding point between a pixel of the projection unit and a pixel of the imaging unit for a relation between one of the projection imaging apparatuses whose posture has changed and one of the projection imaging apparatuses whose posture has not changed; and estimate a relative posture of the projection imaging apparatus whose posture has changed with respect to the projection imaging apparatus whose posture has not changed on the basis of the corresponding point between a pixel of the projection unit and a pixel of the imaging unit detected for a relation between the projection imaging apparatus whose posture has changed and the projection imaging apparatus whose posture has not changed.

In addition, an information processing apparatus according to the present technology is an information processing apparatus including a corresponding point detection unit that detects, in regard to a projection imaging apparatus having a projection unit that projects an image on a projection surface and an imaging unit that images the projection surface, a corresponding point between a pixel of the projection unit and a pixel of the imaging unit of the projection imaging apparatus whose posture has not changed; and a projection surface shape estimation unit that estimates a shape of the projection surface on the basis of the corresponding point detected by the corresponding point detection unit for a relation between a pixel of the projection unit and a pixel of the imaging unit of the projection imaging apparatus whose posture has not changed.

The projection surface shape estimation unit can estimate a shape of the projection surface for a part of the projection surface whose shape is unknown.

In addition, an information processing method according to the present technology is an information processing method configured to detect, in regard to a projection imaging apparatus having a projection unit that projects an image on a projection surface and an imaging unit that images the projection surface, a corresponding point between a pixel of the projection unit and a pixel of the imaging unit of the projection imaging apparatus whose posture has not changed; and estimate a shape of the projection surface on the basis of the corresponding point detected for a relation between a pixel of the projection unit and a pixel of the imaging unit of the projection imaging apparatus whose posture has not changed.

A projection imaging apparatus according to the present technology is a projection imaging apparatus including a projection unit that projects an image on a projection surface; an imaging unit that images the projection surface; a sensor unit that detects at least one of a position and a direction; a determination unit that determines whether a posture has changed on the basis of a sensor output from the sensor unit; a corresponding point detection unit that detects, in a case where the determination unit determines that the posture has changed, a corresponding point between a pixel of the projection unit and a pixel of the imaging unit for a relation with another projection imaging apparatus which includes the projection unit, the imaging unit, and the sensor unit and whose posture has not changed; and a relative posture estimation unit that estimates a relative posture with respect to the another projection imaging apparatus on the basis of the corresponding point detected by the corresponding point detection unit.

The corresponding point detection unit can detect a corresponding point between a pixel of the projection unit of the another projection imaging apparatus and a pixel of the own imaging unit of the projection imaging apparatus.

The corresponding point detection unit can detect a corresponding point between a pixel of the own projection unit of the projection imaging apparatus and a pixel of the imaging unit of the another projection imaging apparatus.

A corresponding point change detection unit that detects a change in a corresponding point between a pixel of the own projection unit and a pixel of the own imaging unit of the projection imaging apparatus; and a posture change detection unit that detects an own posture change in the projection imaging apparatus on the basis of a sensor output from the sensor unit can be further included, in which the determination unit can determine whether an own posture of the projection imaging apparatus has changed on the basis of a detection result of the corresponding point change detection unit and a detection result of the posture change detection unit.

The corresponding point detection unit can be configured to further detect a corresponding point between a pixel of the own projection unit and a pixel of the own imaging unit of the projection imaging apparatus, and a projection surface shape estimation unit that estimates a shape of the projection surface on the basis of the corresponding point detected by the corresponding point detection unit for a relation between a pixel of the own projection unit and a pixel of the own imaging unit of the projection imaging apparatus can be further included.

The projection surface shape estimation unit can estimate a shape of the projection surface for a part of the projection surface whose shape is unknown within a range on which an image is projected by the own projection unit of the projection imaging apparatus.

Furthermore, an information processing method according to the present technology is an information processing method for a projection imaging apparatus including a projection unit that projects an image on a projection surface; an imaging unit that images the projection surface; and a sensor unit that detects at least one of a position and a direction, the information processing method being configured to: determine whether a posture has changed on the basis of a sensor output from the sensor unit; detect, in a case where the posture is determined to have changed, a corresponding point between a pixel of the projection unit and a pixel of the imaging unit for a relation with another projection imaging apparatus which includes the projection unit, the imaging unit, and the sensor unit and whose posture has not changed; and estimate a relative posture with respect to the another projection imaging apparatus on the basis of the detected corresponding point.

In addition, a projection imaging apparatus according to the present technology is a projection imaging apparatus including a projection unit that projects an image on a projection surface; an imaging unit that images the projection surface; a sensor unit that detects at least one of a position and a direction; a determination unit that determines whether a posture has changed on the basis of a sensor output from the sensor unit; a corresponding point detection unit that detects, in a case where the determination unit determines that the posture has not changed, a corresponding point between a pixel of the own projection unit and a pixel of the own imaging unit of the projection imaging apparatus; and a projection surface shape estimation unit that estimates a shape of the projection surface on the basis of the corresponding point detected by the corresponding point detection unit.

In addition, an information processing method according to the present technology is an information processing method for a projection imaging apparatus including a projection unit that projects an image on a projection surface; an imaging unit that images the projection surface; and a sensor unit that detects at least one of a position and a direction, the information processing method being configured to: determine whether a posture has changed on the basis of a sensor output from the sensor unit; detect, in a case where the posture is determined to have not changed, a corresponding point between a pixel of the own projection unit and a pixel of the own imaging unit of the projection imaging apparatus; and estimate a shape of the projection surface on the basis of the detected corresponding point.

In the information processing apparatus and method according to the present technology, in regard to projection imaging apparatuses each having a projection unit that projects an image on a projection surface and an imaging unit that images the projection surface, a corresponding point between a pixel of the projection unit and a pixel of the imaging unit is detected for a relation between one of the projection imaging apparatuses whose posture has changed and one of the projection imaging apparatuses whose posture has not changed, and a relative posture of the projection imaging apparatus whose posture has changed with respect to the projection imaging apparatus whose posture has not changed is estimated on the basis of the corresponding point between a pixel of the projection unit and a pixel of the imaging unit detected for a relation between the projection imaging apparatus whose posture has changed and the projection imaging apparatus whose posture has not changed.

In another information processing apparatus and method according to the present technology, in regard to a projection imaging apparatus having a projection unit that projects an image on a projection surface and an imaging unit that images the projection surface, a corresponding point between a pixel of the projection unit and a pixel of the imaging unit of the projection imaging apparatus whose posture has not changed is detected, and a shape of the projection surface is estimated on the basis of the corresponding point detected for a relation between a pixel of the projection unit and a pixel of the imaging unit of the projection imaging apparatus whose posture has not changed.

In the projection imaging apparatus and the information processing method according to the present technology, in a projection imaging apparatus including a projection unit that projects an image on a projection surface, an imaging unit that images the projection surface, and a sensor unit that detects at least one of a position and a direction, whether a posture has changed is determined on the basis of a sensor output from the sensor unit, a corresponding point between a pixel of the projection unit and a pixel of the imaging unit is detected for a relation with another projection imaging apparatus which includes the projection unit, the imaging unit, and the sensor unit and whose posture has not changed in a case where the posture is determined to have changed, and a relative posture with respect to the another projection imaging apparatus is estimated on the basis of the detected corresponding point.

In another projection imaging apparatus and another information processing method according to the present technology, in a projection imaging apparatus including a projection unit that projects an image on a projection surface, an imaging unit that images the projection surface, and a sensor unit that detects at least one of a position and a direction, whether a posture has changed is determined on the basis of a sensor output from the sensor unit, a corresponding point between a pixel of the own projection unit and a pixel of the own imaging unit of the projection imaging apparatus is detected in a case where the posture is determined to have not changed, and a shape of the projection surface is estimated on the basis of the detected corresponding point.

Effects of the Invention

According to the present technology, information can be processed. Additionally, according to the present technology, it is possible to suppress an increase in processing amount of processing related to update of correction information used for geometric correction and the like.

BRIEF DESCRIPTION OF DRAWINGS

FIG. 7 is a diagram for explaining an example of processing executed as a calibration.

FIG. 19 is a flowchart for explaining an example of a flow of projection surface shape estimation processing.

FIG. 20 is a flowchart for explaining an example of a flow of corresponding point detection processing.

MODE FOR CARRYING OUT THE INVENTION

Modes for carrying out the present disclosure (hereinafter, referred to as embodiments) will be described below. Note that the description will be given in the following order.

1. First Embodiment (Projection Imaging System)
2. Second Embodiment (Corresponding Point Detection Processing)
3. Third Embodiment (Projection Imaging System)

1. First Embodiment

<Projection Imaging System>

Figure 1:
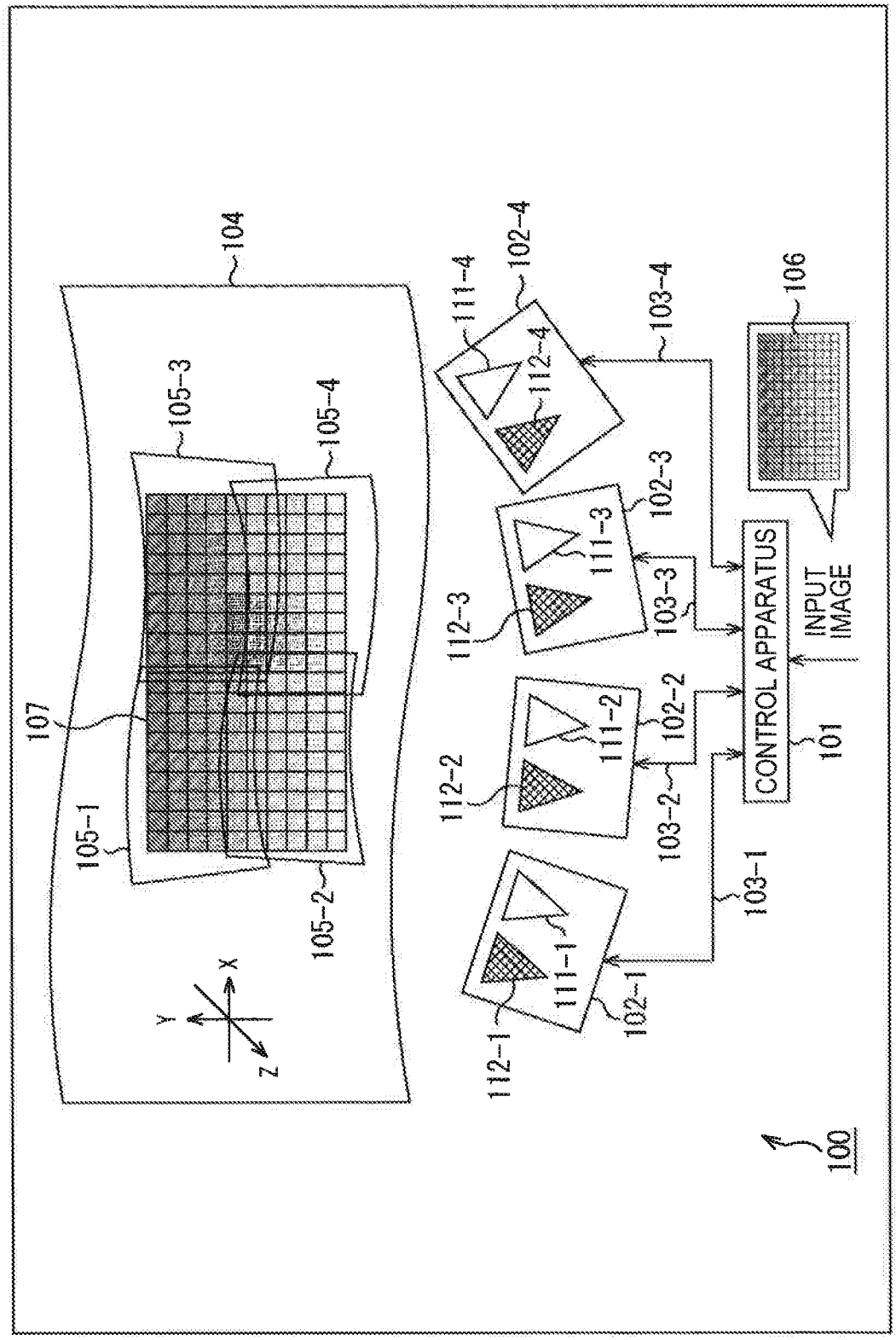
FIG. 1 is a diagram for explaining a main configuration example of a projection imaging system.

FIG. 1 illustrates a main configuration example of a projection imaging system to which a control apparatus which is an embodiment of an information processing apparatus to which the present technology is applied and a projection imaging apparatus which is an embodiment of a projection imaging apparatus to which the present technology is applied are applied. The projection imaging system 100 illustrated in FIG. 1 is a system that projects an image using a plurality of projection imaging apparatuses 102.

As illustrated in FIG. 1, the projection imaging system 100 has a control apparatus 101, a projection imaging apparatus 102-1 to a projection imaging apparatus 102-4, and a communication cable 103-1 to a communication cable 103-4.

The projection imaging apparatuses 102-1 to 102-4 are connected to the control apparatus 101 so as to be able to communicate therewith via the communication cables 103-1 to 103-4, respectively.

The control apparatus 101 communicates with each of the projection imaging apparatuses 102-1 to 102-4 and controls the actions thereof. For example, the control apparatus 101 causes the projection imaging apparatuses 102-1 to 102-4 to project an image on a projection surface 104 and to capture an image (projection image) projected on the projection surface 104.

In addition, for example, the control apparatus 101 can calibrate relative postures (for example, rotation components (relative directions) and translation components (relative positions)) of a projection unit 111 and an imaging unit 112 included in each of the projection imaging apparatuses 102-1 to 102-4. Furthermore, for example, the control apparatus 101 can make correction (position alignment, geometric correction, and so on) on an image projected by each of the projection imaging apparatuses 102-1 to 102-4 using a result of the calibration.

Each of the projection imaging apparatuses 102-1 to 102-4 is controlled by the control apparatus 101 to project an image on the projection surface 104 and to image the projection surface 104 (for example, a projection image projected on the projection surface 104). That is, the projection imaging apparatuses 102-1 to 102-4 have similar configurations to each other to have similar functions. In a case where it is not necessary to distinguish these projection imaging apparatuses 102-1 to 102-4 from each other when described, these projection imaging apparatuses are referred to as projection imaging apparatuses 102.

The projection imaging apparatus 102 has the projection unit 111 and the imaging unit 112. That is, the projection imaging apparatus 102-1 has a projection unit 111-1 and an imaging unit 112-1. The projection imaging apparatus 102-2 has a projection unit 111-2 and an imaging unit 112-2. The projection imaging apparatus 102-3 has a projection unit 111-3 and an imaging unit 112-3. The projection imaging apparatus 102-4 has a projection unit 111-4 and an imaging unit 112-4.

Each of the projection units 111-1 to 111-4 projects an image. That is, the projection units 111-1 to 111-4 have similar configurations to each other to have similar functions. In a case where it is not necessary to distinguish these projection units 111-1 to 111-4 from each other when described, these projection units are referred to as projection units 111. In addition, each of the imaging units 112-1 to 112-4 images a subject to obtain a captured image. That is, the imaging units 112-1 to 112-4 have similar configurations to each other to have similar functions. In a case where it is not necessary to distinguish these imaging units 112-1 to 112-4 from each other when described, these imaging units are referred to as imaging units 112.

Meanwhile, each of the communication cables 103-1 to 103-4 is a communication medium supporting a predetermined communication standard. That is, the communication cables 103-1 to 103-4 have similar configurations to each other to have similar functions. In a case where it is not necessary to distinguish these communication cables 103-1 to 103-4 from each other when described, these communication cables are referred to as communication cables 103.

The communication cable 103 is, for example, a cable conforming to high-definition multimedia interface (HDMI) (registered trademark). As a matter of course, the communication standard support by the communication cable 103 is arbitrary and the communication cable 103 may support a communication standard other than the HDMI (registered trademark), such as a display port (DisplayPort).

The projection surface 104 is an example of a destination on which the projection imaging apparatus 102 projects an image (projection destination). The projection surface 104 may be a flat surface, a curved surface, or a surface having irregularities in part or the whole, or may be made up of a plurality of surfaces. In addition, the color of the projection surface 104 is arbitrary and the projection surface 104 may be made up of a plurality of colors or may have a pattern or a picture.

Incidentally, this projection surface 104 may be formed on an arbitrary object. For example, the projection surface 104 may be formed on a planar object such as a so-called screen or a wall surface. The projection surface 104 also may be formed on a three-dimensional structure. For example, the projection surface 104 may be formed on wall surfaces of buildings, station buildings, castles and other constructs or may be formed on, for example, natural objects such as rocks, artificial objects such as signboards and statues, furniture such as chests of drawers, chairs, and desks. Alternatively, the projection surface 104 may be formed on organisms such as persons, animals or plants. The projection surface 104 also may be formed on a plurality of surfaces, such as a wall, a floor, a ceiling, and so on of a room space.

In addition, the projection surface 104 may be formed on a solid or may be formed on a liquid or a gas. For example, the projection surface 104 may be formed on a water surface of a pond, a pool, or the like, a flowing water surface of a waterfall, a fountain, or the like, or a gas such as fog or mist. Meanwhile, the projection surface 104 may move or may be deformed or discolored. In addition, the projection surface 104 may be formed on a plurality of objects, for example, walls, furniture, and people in the room, a plurality of buildings, or castle walls and fountains.

<Projection Area>

In FIG. 1, a projection image 105-1 on the projection surface 104 is an image projected by the projection unit 111-1 of the projection imaging apparatus 102-1. Likewise, a projection image 105-2 is an image projected by the projection unit 111-2 of the projection imaging apparatus 102-2. A projection image 105-3 is an image projected by the projection unit 111-3 of the projection imaging apparatus 102-3. A projection image 105-4 is an image projected by the projection unit 111-4 of the projection imaging apparatus 102-4. In a case where it is not necessary to distinguish these projection images 105-1 to 105-4 from each other when described, these projection images will be referred to as projection images 105.

Note that the positions and the shapes of the respective projection images 105 on the projection surface 104 are arbitrary but, in the case of the example in FIG. 1, one projection area (an area where an image is projected) is formed by the respective projection images 105 on this projection surface 104. The projection image 105-1 forms an upper left part of the one projection area, the projection image 105-2 forms a lower left part of the one projection area, the projection image 105-3 forms an upper right part of the one projection area, and the projection image 105-4 forms a lower right part of the one projection area. In addition, each projection image 105 is designed in such a manner that a part thereof covers (overlaps) a part of other projection image. By providing such an area (overlapping area) where a plurality of projection images cover each other, one projection area can be more reliably (more stably) formed by the plurality of projection images. Each projection imaging apparatus 102 (projection unit 111) is arranged in such a posture (position and projection direction) as to realize such one projection area.

<Projection Mapping>

The control apparatus 101 can perform so-called projection mapping by controlling each projection imaging apparatus 102. For example, the control apparatus 101 can cause an image to be projected from each projection imaging apparatus 102 and to be projected as one projection image in the above-described one projection area.

For example, the control apparatus 101 can cause the respective projection imaging apparatuses 102 to collaborate to project one input image 106 on the projection surface 104 as one corrected projection image 107. In the case of the example in FIG. 1, the control apparatus 101 divides the one input image 106 into two in an up-down direction and into two in a left-right direction (totally divides the one input image 106 in four) and supplies each partial image to each projection imaging apparatus 102 to project on the projection surface 104. Then, these respective projection images are combined on the projection surface 104 to form one projection image. By controlling in such a manner, for example, a projection image with a resolution higher than the resolution of one projection unit 111 (in other words, a projection image with a size larger than the maximum size of an image projected by one projection unit 111) can be realized.

<Image Correction>

When the projection images are combined in this manner, in order to appropriately combine the projection images projected by the respective projection units 111 without giving any sense of incompatibility such that one projection image (corrected projection image 107) is formed, the control apparatus 101 performs correction processing such as position alignment, geometric correction, and image quality correction (for example, luminance, color, and resolution) on each image projected by each projection imaging apparatus 102. Particularly, blending processing or the like is performed on the overlapping area where projection is performed from the plurality of projection units 111 such that an image without sense of incompatibility is obtained.

<Setting of Correction Information>

How to correct the image during these corrections is set according to the posture (position (translation component) and direction (rotation component)) of each projection imaging apparatus 102 (projection unit 111), the shape of the projection surface 104, and so on. That is, the control apparatus 101 estimates the posture of each projection imaging apparatus 102 (projection unit 111) and the shape of the projection surface 104 and, on the basis of a result of the estimation, sets how to correct each image (sets setting information indicating how to set).

In addition, the control apparatus 101 finds a correspondence relationship of pixels between the projection unit 111 and the imaging unit 112 and utilizes this correspondence relationship to estimate the posture of each projection imaging apparatus 102 (projection unit 111) and the shape of the projection surface 104. The relative posture between the projection imaging apparatuses 102 is estimated by pattern projection (structured light) from the projection units 111, imaging of the projection surface 104 by the imaging units 112, and so on carried out among the plurality of projection imaging apparatuses 102. Meanwhile, shape estimation (depth sensing) for the projection surface 104 is performed by the pattern projection (structured light) from the projection unit 111, imaging of the projection surface 104 by the imaging unit 112, and so on carried out in each projection imaging apparatus 102.

<Initial Setting>

In the case of performing the projection mapping as described above, the control apparatus 101 finds the correspondence relationship of pixels between the projection unit 111 and the imaging unit 112 for all the projection imaging apparatuses 102 prior to projecting an image such as contents and estimates the posture of the projection imaging apparatus 102 (projection unit 111) and the shape of the projection surface 104 to set the correction information. Then, when projecting an image such as contents, the control apparatus 101 corrects the image in accordance with this correction information.

Here, each projection imaging apparatus 102 is calibrated in advance. For example, the characteristics related to the projection by the projection unit 111 and the characteristics related to the imaging by the imaging unit 112 in each projection imaging apparatus 102 are clear (known). In addition, the posture (position and projection direction) of the projection unit 111 and the posture (position and imaging direction) of the imaging unit 112 in each projection imaging apparatus 102 are fixed and known. That is, a relationship of postures (also referred to as relative posture) between the projection unit 111 and the imaging unit 112 within each projection imaging apparatus 102 is known. Note that the "projection direction" here indicates a direction in which the projection unit 111 projects an image.

Similarly, the "imaging direction" indicates a direction in which the imaging unit 112 images a subject. Such internal variables and external variables of each projection imaging apparatus 102 (the projection unit 111 and the imaging unit 112) are calibrated using a dedicated apparatus or the like in advance (calibration, estimation of various variables, and so on).

Note that, when an image such as contents is projected, the relative posture between the projection imaging apparatuses 102 is clear (known) because of estimation processing described above. That is, the relative posture between the projection units 111, the relative posture between the imaging units 112, and the relative posture between the projection unit 111 and the imaging unit 112 are clear among the respective projection imaging apparatuses 102.

In addition, the position and the shape of the projection surface 104 (relative position and shape from each projection unit 111) are also clear (known). That is, the position and the shape of the projection image 105 by each projection imaging apparatus 102 (projection unit 111) on the projection surface 104 are also clear.

As described above, the control apparatus 101 causes the plurality of projection imaging apparatuses 102 to collaborate, thereby being able to enhance the resolution of the projection image (in other words, increase the image size while suppressing a reduction in resolution (image quality)). Note that the input image 106 (corrected projection image 107) may be a moving image or may be a still image.

<Position Misalignment/Projection Surface Change>

As described above, the corrected projection image 107 is realized by correcting an image to be projected in accordance with the correction information set in advance. Therefore, if an environment changes during image projection, there has been a possibility that the correction information results in an inappropriate value and the image quality of the corrected projection image 107 is reduced.

Figure 2:
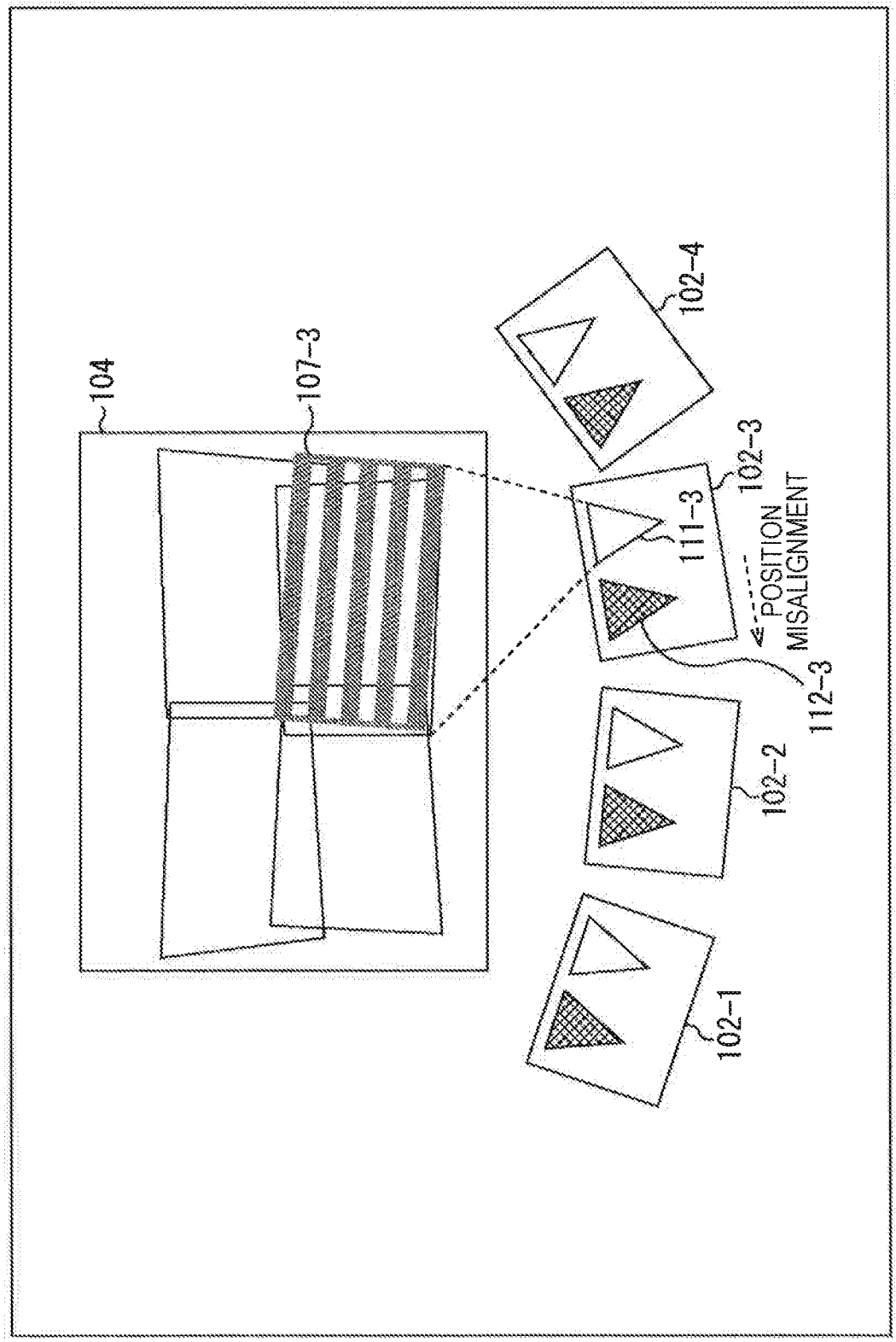
FIG. 2 is a diagram for explaining an example of how a posture changes.

For example, as illustrated in FIG. 2, when the projection imaging apparatus 102-3 moves (position misalignment occurs) while the respective projection imaging apparatuses 102 project images on the projection surface 104 to project the corrected projection image 107, there has been a possibility that the relative posture and so on between the projection imaging apparatus 102-3 and the projection surface 104 change. Therefore, there has been a possibility of a change in the state (position, dimension, shape, image quality, and so on) of the projection image 105-3. That is, the state (position, dimension, shape, image quality, and so on) of a partial image 107-3 of the corrected projection image 107 included in this projection image 105-3 can also change. Therefore, there has been a possibility that the image quality is reduced even in the corrected projection image 107, for example, distortion, partial change in image quality, or the like occurs or the image is separated into a plurality of images not to be organized as one projection image.

Figure 3:
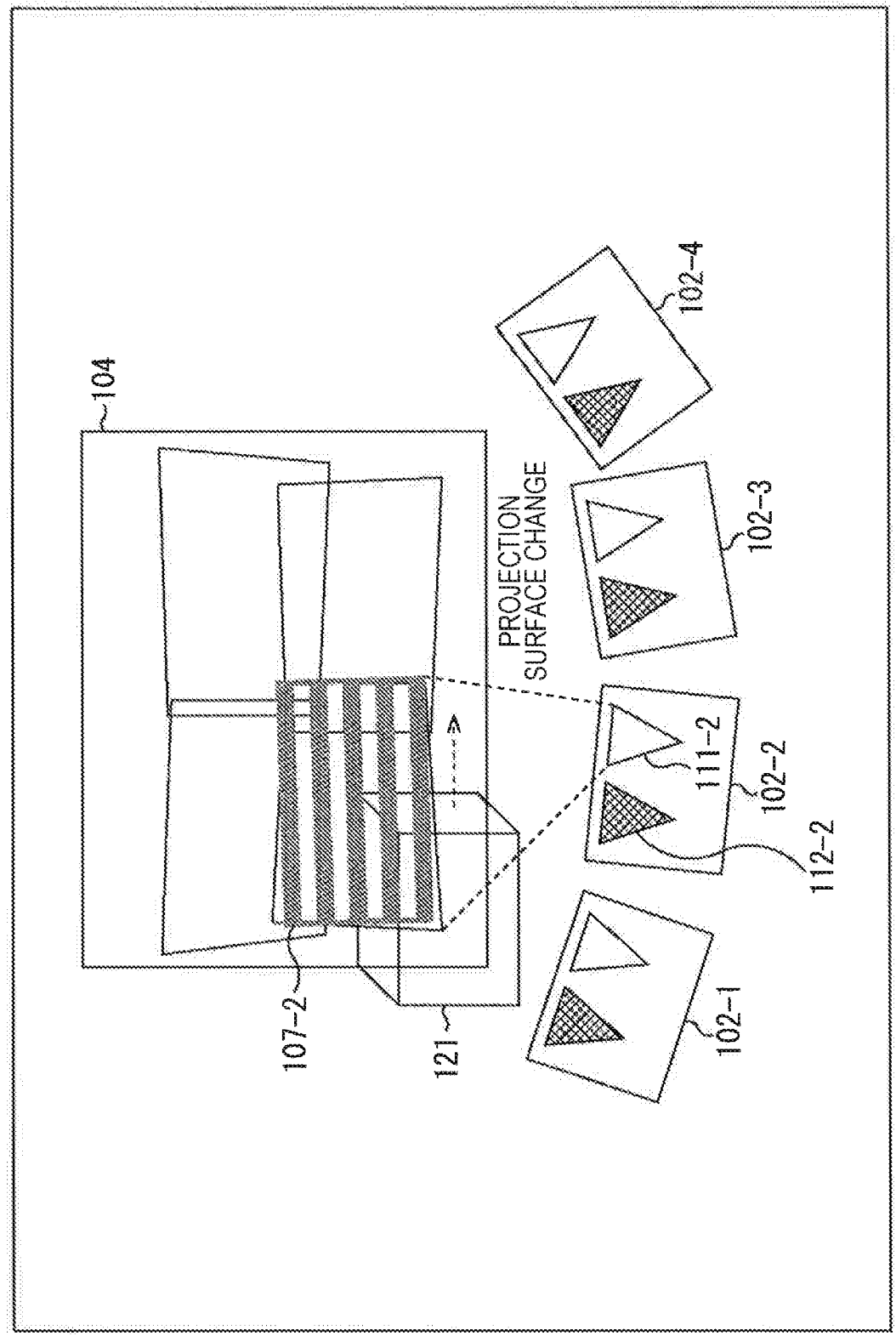
FIG. 3 is a diagram for explaining an example of how the shape of a projection surface changes.

In addition, for example, as illustrated in FIG. 3, when a three-dimensional object 121 is newly installed in front of a position on the projection surface 104 where the projection by the projection imaging apparatus 102-2 is performed while the respective projection imaging apparatuses 102 project images on this projection surface 104 to project the corrected projection image 107, at least a part of the projection image 105-2 projected by the projection imaging apparatus 102-2 is caused to be projected on the three-dimensional object 121, causing a possibility of the occurrence of a state in which the shape of the projection surface 104 changes as seen from the projection imaging apparatus 102-2. Therefore, there has been a possibility of a change in the state (position, dimension, shape, image quality, and so on) of the projection image 105-2. That is, the state (position, dimension, shape, image quality, and so on) of a partial image 107-2 of the corrected projection image 107 included in this projection image 105-2 can also change. Therefore, there has been a possibility that the image quality is reduced even in the corrected projection image 107, for example, distortion, partial change in image quality, or the like occurs or the image is separated into a plurality of images not to be organized as one projection image.

Therefore, when the position misalignment of the projection imaging apparatus 102, the shape change in the projection surface 104, or the like occurs during the image projection as described above, the correction information for geometric correction or the like needs to be set again in order to suppress a reduction in image quality of the projection image.

<Overlap Estimation>

As described above, when one video is projected using the plurality of projection imaging apparatuses 102, a portion where the projection by the respective projection units 111 is superimposed on the projection surface 104, namely, the overlapping area needs to be sensed using the imaging units 112 to grasp how the projection overlaps.

Figure 4:
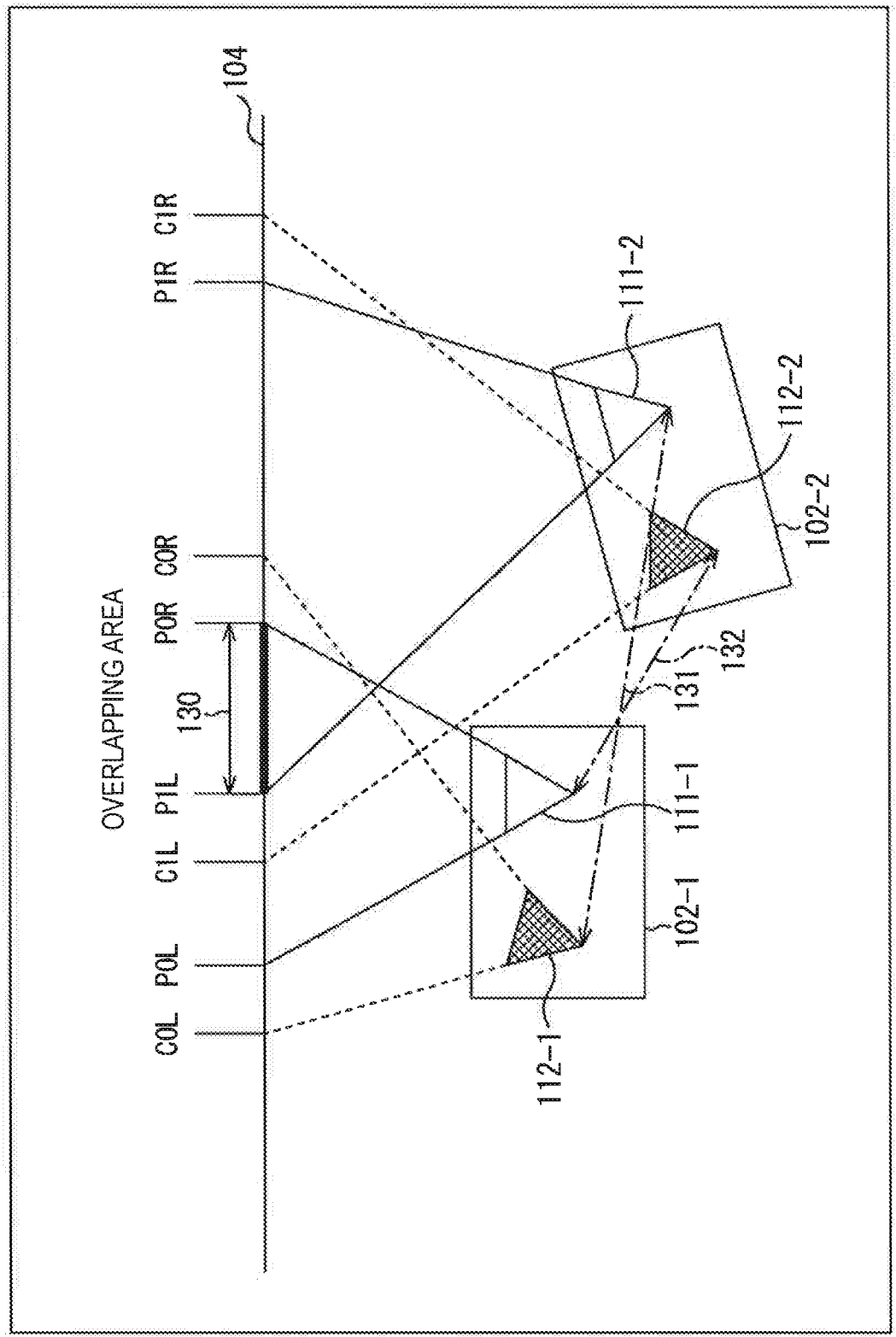
FIG. 4 is a diagram for explaining an example of how a calibration proceeds.

For example, in the case of FIG. 4, a projection area on the projection surface 104 responsible by the projection unit 111-1 of the projection imaging apparatus 102-1 (a range where the projection unit 111-1 projects an image) spans in a range of P0L to P0R. Likewise, a projection area on the projection surface 104 responsible by the projection unit 111-2 of the projection imaging apparatus 102-2 (a range where the projection unit 111-2 projects an image) spans in a range of P1L to P1R. That is, a range indicated by a double-headed arrow 130 (a range of P1L to P0R) is applicable. This overlapping area is simply specified.

This means the same as estimating the relative posture (a rotation component (R) and a translation component (T)) between the projection unit 111 and the imaging unit 112. Additionally, information necessary for estimating the relative posture is the correspondence relationship of pixels between the projection unit 111 and the imaging unit 112. In the case of the example in FIG. 4, it is only required to find a correspondence relationship between a pixel of the projection unit 111-2 and a pixel of the imaging unit 112-1 indicated by a double-headed arrow 131 or a correspondence relationship between a pixel of the projection unit 111-1 and a pixel of the imaging unit 112-2 indicated by a double-headed arrow 132, or alternatively, to find both thereof.

Figure 5:
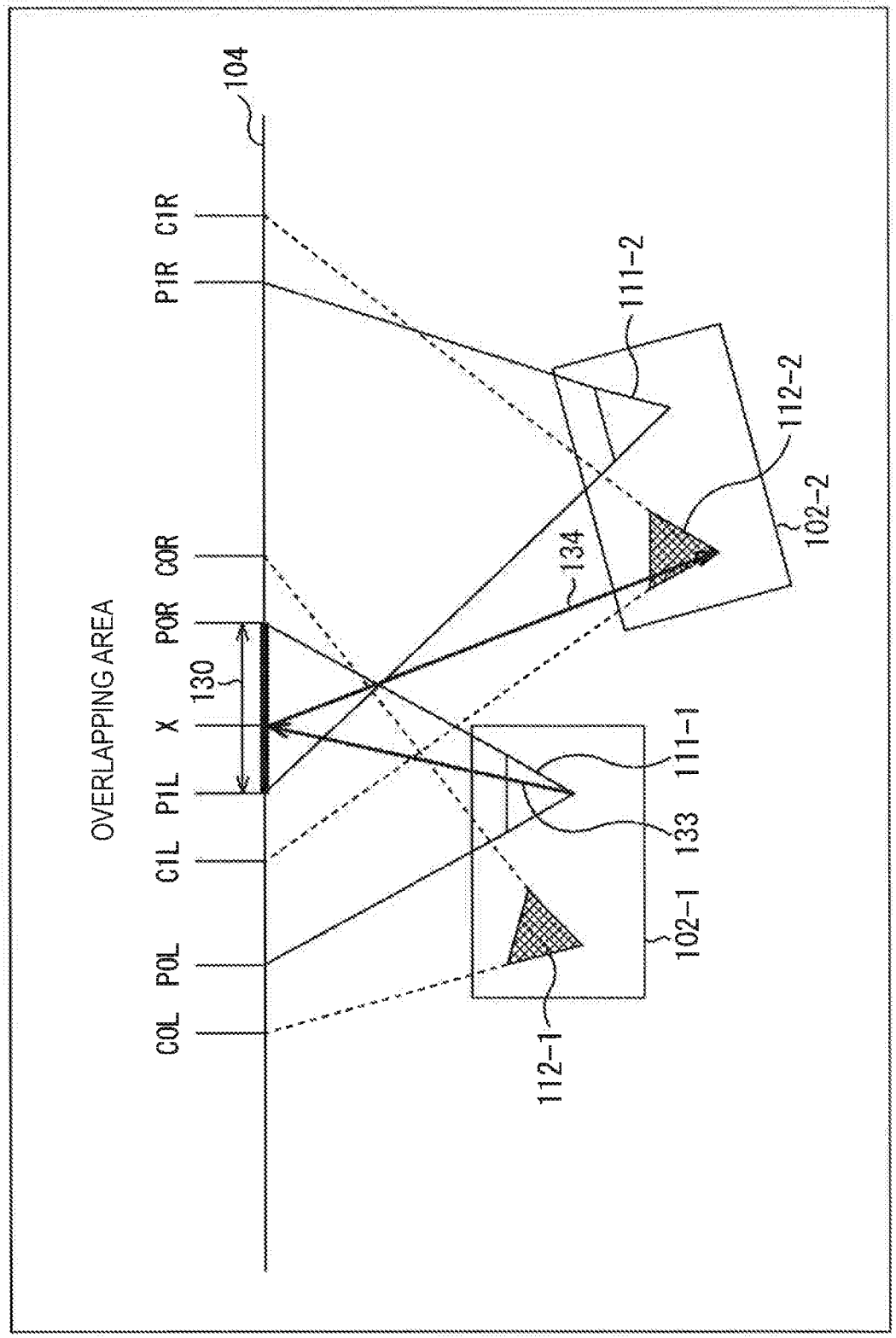
FIG. 5 is a diagram for explaining an example of how a calibration proceeds.

Furthermore, as illustrated in FIG. 5, the correspondence relationship between pixels can be expressed as which pixel of the imaging unit 112 is a pixel to which a certain pixel of the projection unit 111 corresponds. That is, for example, it is assumed in FIG. 5 that light emitted from the projection unit 111-1 (arrow 133) is reflected at X on the projection surface 104 and received by the imaging unit 112-2 (arrow 134). If it is possible to grasp a correspondence relationship between a pixel of the projection unit 111 that have emitted light and a pixel of the imaging unit 112 that have received this light as described above (namely, which pixel of the projection unit 111 is a pixel to which each pixel of the imaging unit 112 corresponds), the overlapping area can be detected.

Figure 6:
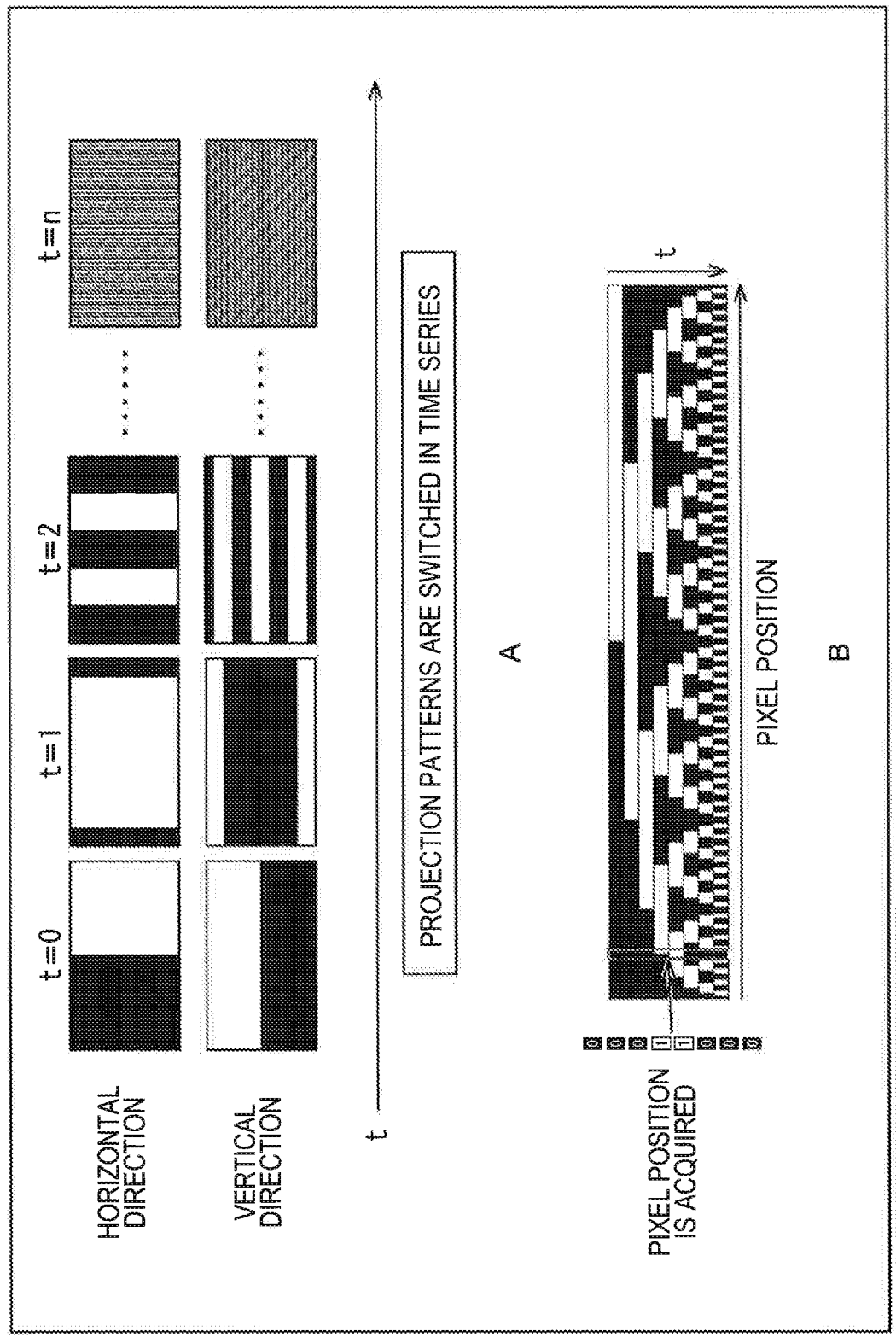
FIG. 6 is a diagram for explaining an example of a method using a gray code.

As a method for acquiring such a correspondence relationship of pixels, for example, there has been a method using a gray code. In the case of this method, for example, predetermined pattern images as illustrated in A of FIG. 6 are projected from the projection unit 111 while being switched in time series such that each pattern is imaged by the imaging unit 112. Then, when the imaging of all the patterns is completed, "1" (white) or "0" (black) in each imaged pattern is detected for each pixel of the imaging unit 112 and, as illustrated in B of FIG. 6, the position of a projector pixel is acquired by decoding such patterns of "1" and "0". With these processes, the correspondence relationship of the pixels can be acquired.

<Online Sensing>

However, in this method, it has been necessary to project the pattern images as illustrated in FIG. 6 as examples in order to acquire the correspondence relationship between the pixels and the image projection must be interrupted each time. Namely, viewers watching the projection image had to be prevented from viewing. Therefore, a technology called "online sensing" for acquiring the correspondence relationship between pixels while an image such as contents is being projected is conceivable. As this online sensing, for example, a technique of embedding a gray code or the like in the projection image, a technique utilizing an image feature amount such as SIFT, and a technique utilizing invisible light such as Infrared (infrared light) are conceivable.

However, in any case of these methods, the correction information has been updated for all the projection imaging apparatuses 102. That is, as described above, all items of processing such as the calculation of a pixel correspondence relationship, the posture estimation for the projection imaging apparatus 102 (projection unit 111), and the shape estimation for the projection surface 104 have been performed for all the projection imaging apparatuses 102. For example, even in a case where the postures of some projection imaging apparatuses 102 have changed, all of these items of the processing have been performed for all the projection imaging apparatuses 102. Therefore, there has been a risk that unnecessary processing is performed, for example, the processing becomes redundant for the projection imaging apparatus 102 whose position has not changed (in which position misalignment does not occur). That is, there has been a risk that the processing amount of processing related to the update of the correction information used for geometric correction and the like unnecessarily increases and the processing time unnecessarily increases. In addition, there has been a risk that, as the number of the projection imaging apparatuses 102 to be caused to collaborate increases, the processing amount (processing time) therefor unnecessarily increases.

As described above, such processing related to the update of the correction information used for geometric correction and the like can be performed using the online sensing while an image such as contents is being projected but, in some cases, there even has been a possibility that the image quality of the projection image is reduced due to the influence of this processing on the projection of the image such as contents. For example, in a case where a pattern image is projected, since this pattern image is projected so as to be superimposed on an image such as contents, there has been a possibility that a picture, switching, and so on of the pattern image are visible to a viewer depending on the contents of the image such as contents. There has been a possibility that such influence increases as the processing time of the processing related to the update of the correction information as described above increases.

<Selection of Processing according to Change Factor>

Therefore, as a table illustrated in FIG. 7, processing to be executed as the processing related to the update of the correction information used for geometric correction and the like is selected according to a change factor.

For example, in the case of processing (initial sensing) related to the update of the correction information used for geometric correction and the like performed prior to projecting an image such as contents, neither a corresponding point of pixels between the projection unit 111 and the imaging unit 112 for a relation between the projection imaging apparatuses 102, the posture of the projection imaging apparatus 102, nor the shape of the projection surface 104 is clear for all the projection imaging apparatuses 102. Therefore, the control apparatus 101 performs each processing of detecting the corresponding point of pixels between the projection unit 111 and the imaging unit 112 for a relation between the projection imaging apparatuses 102, estimating the posture of the projection imaging apparatus 102, and estimating the shape of the projection surface 104 for all the projection imaging apparatuses 102. That is, in the initial sensing, the control apparatus 101 executes all items of the processing related to the update of the correction information used for geometric correction and the like for all the projection imaging apparatuses 102.

Additionally, for example, in a case where the postures of all the projection imaging apparatuses 102 change during the projection of an image such as contents, the corresponding point of pixels between the projection unit 111 and the imaging unit 112 for a relation between the projection imaging apparatuses 102, the posture of the projection imaging apparatus 102, and the shape of the projection surface 104 are all unclear for all the projection imaging apparatuses 102. Therefore, the control apparatus 101 performs each processing of detecting the corresponding point of pixels between the projection unit 111 and the imaging unit 112 for a relation between the projection imaging apparatuses 102, estimating the posture of the projection imaging apparatus 102, and estimating the shape of the projection surface 104 for all the projection imaging apparatuses 102. That is, in a case where the postures of all the projection imaging apparatuses 102 change during the projection of an image such as contents, the control apparatus 101 executes all items of the processing related to the update of the correction information used for geometric correction and the like for all the projection imaging apparatuses 102 similarly to the case of the initial sensing.

In contrast to this, for example, in a case where the posture of a part of the projection imaging apparatuses 102 changes during the projection of an image such as contents, the corresponding point of pixels between the projection unit 111 and the imaging unit 112 for a relation between the projection imaging apparatuses 102, the posture of the projection imaging apparatus 102, and the shape of the projection surface 104 all continue to be clear for the remaining part of the projection imaging apparatuses 102. That is, the control apparatus 101 can execute only processing related to the part of the projection imaging apparatuses 102 whose posture has changed. Therefore, in a case where the postures of all the projection imaging apparatuses 102 change during the projection of an image such as contents, the control apparatus 101 detects the corresponding point of pixels between the projection unit 111 and the imaging unit 112 for a relation between the projection imaging apparatuses 102 only for a part related to the projection imaging apparatuses 102 whose postures have changed. The control apparatus 101 also estimates the posture only for the projection imaging apparatuses 102 whose postures have changed. In addition, the control apparatus 101 estimates the shape of the projection surface 104 only for a part of the projection surface 104 in which the projection by the projection imaging apparatuses 102 whose postures have changed is performed and whose shape is unknown.

Figure 8:
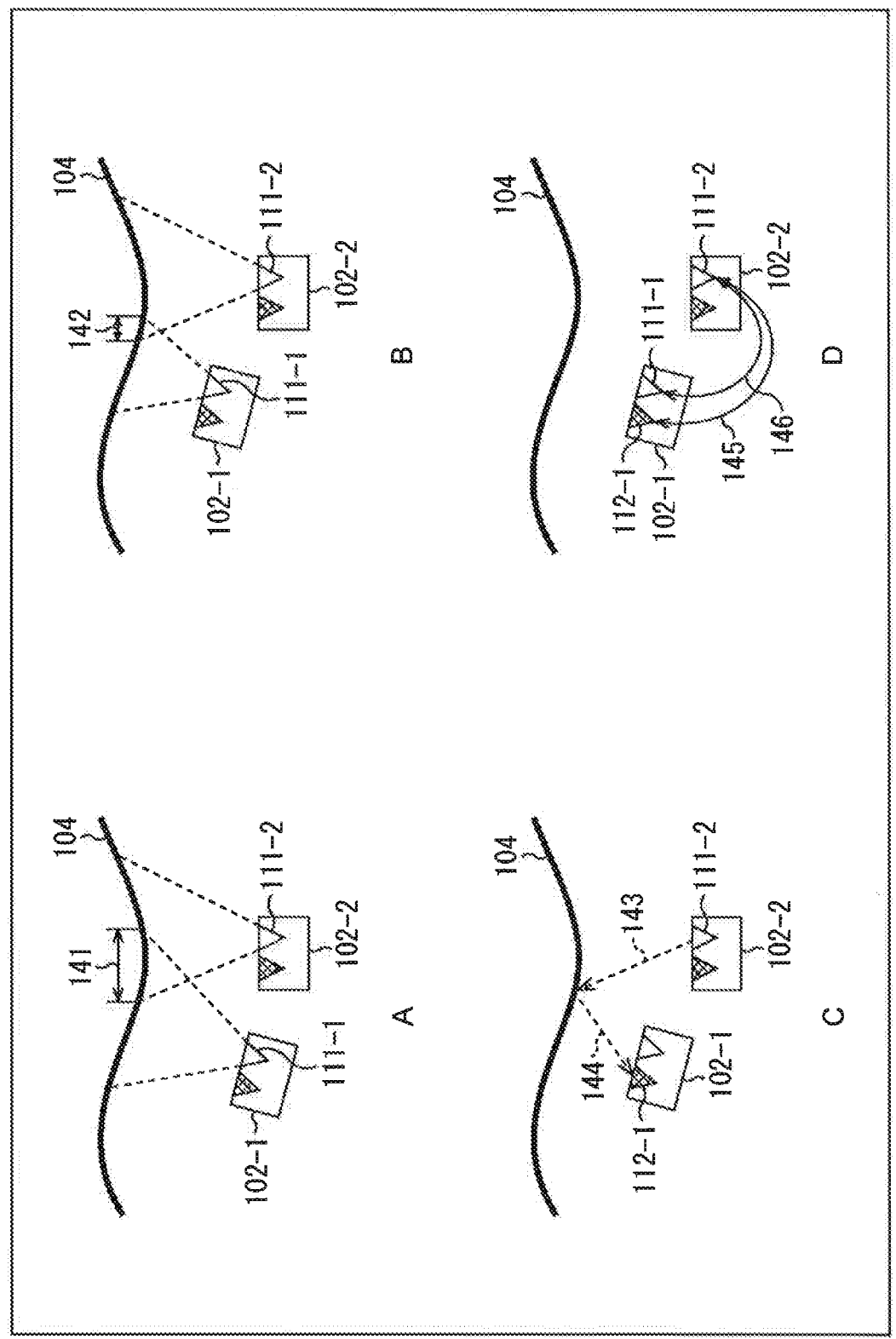
FIG. 8 is a diagram for explaining an example of how a posture is estimated.

For example, as in A of FIG. 8, it is assumed that the projection imaging apparatus 102-1 and the projection imaging apparatus 102-2 are arranged in such a manner that the projection area on the projection surface 104 responsible by the projection unit 111-1 and the projection area on the projection surface 104 responsible by the projection unit 111-2 overlap at a portion indicated by a double-headed arrow 141.

For example, as in B of FIG. 8, when the projection imaging apparatus 102-1 moves, the projection area thereof changes. In this case, a portion indicated by a double-headed arrow 142 serves as the overlapping area and the overlapping area is narrower than the case of A in FIG. 8.

In such a case, the control apparatus 101 simply performs only processing related to the projection imaging apparatus 102-1 that has moved. For example, as illustrated in C of FIG. 8, if the pixel corresponding point between the projection unit 111-2 of the projection imaging apparatus 102-2 and the imaging unit 112-1 of the projection imaging apparatus 102-1 is detected, the control apparatus 101 can estimate the relative posture between the projection unit 111-2 and the imaging unit 112-1 as indicated by a double-headed arrow 145 illustrated in D of FIG. 8. The projection imaging apparatus 102 has already been calibrated and the relative posture between the projection unit 111-1 and the imaging unit 112-1 is known. Therefore, also the relative posture between the projection unit 111-2 and the projection unit 111-1 is estimated as indicated by a double-headed arrow 146 illustrated in D of FIG. 8. That is, by detecting the pixel corresponding point between the projection unit 111-2 and the imaging unit 112-1, the relative posture between the projection imaging apparatuses 102 is estimated.

Figure 9:
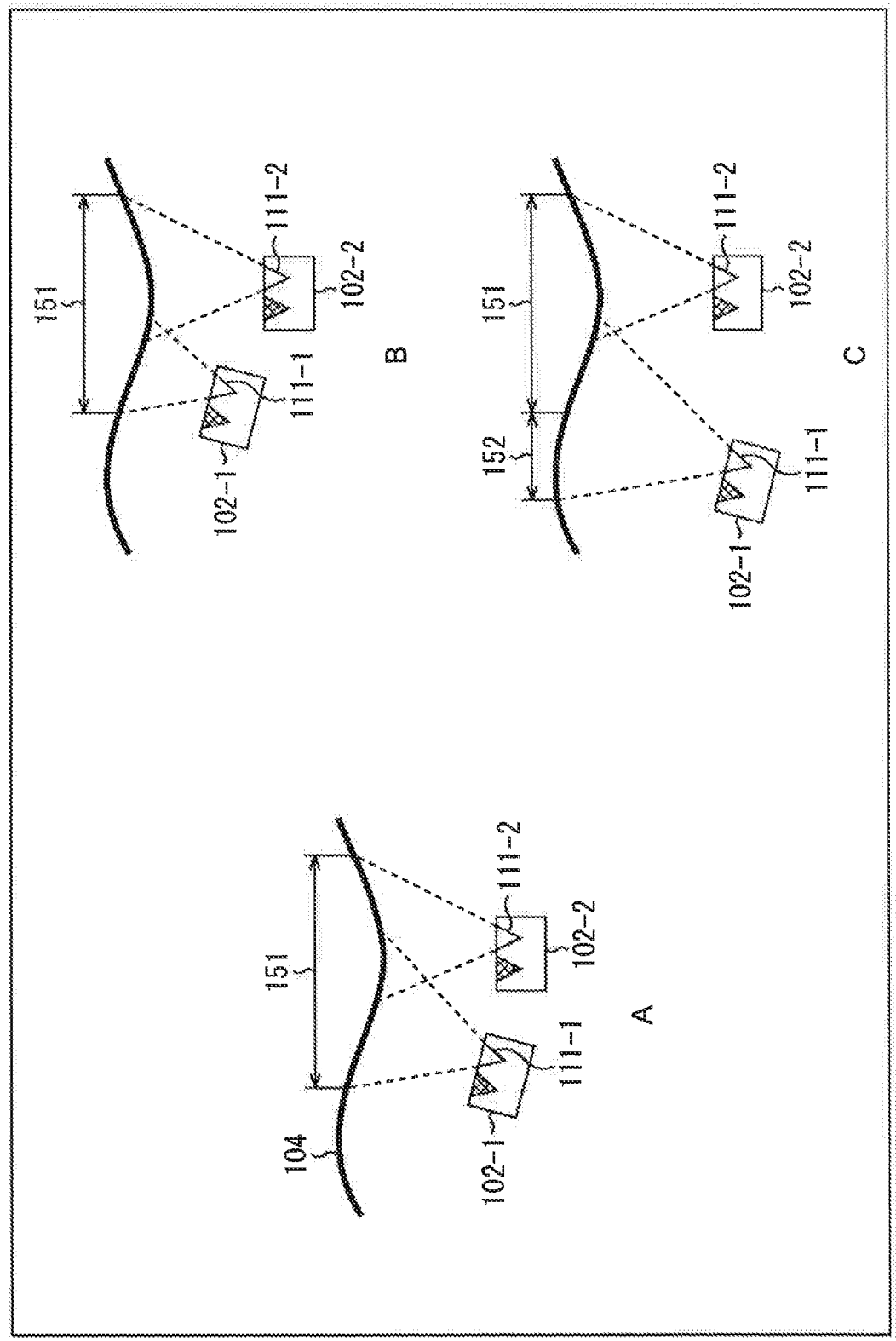
FIG. 9 is a diagram for explaining an example of how the shape of a projection surface is estimated.

Meanwhile, for example, in a case where the projection imaging apparatus 102-1 and the projection imaging apparatus 102-2 are arranged as in A of FIG. 9, assuming that the initial sensing has already been carried out, it is understood, from the projection area on the projection surface 104 responsible by the projection unit 111-1 and the projection area on the projection surface 104 responsible by the projection unit 111-2, that a range on the projection surface 104 indicated by a double-headed arrow 151 is at least known.

For example, when the projection imaging apparatus 102-1 moves as in B of FIG. 9, the projection area thereof changes from the state in A of FIG. 9 but is still located within a range indicated by the double-headed arrow 151. Therefore, since the shape of the projection area on the projection surface 104 responsible by the projection imaging apparatus 102-1 after the movement is known, the shape estimation for the projection surface 104 is unnecessary.

In contrast to this, when the projection imaging apparatus 102-1 moves as in C of FIG. 9, the projection area thereof extends outside a range indicated by the double-headed arrow 151. That is, there is a possibility that a range of the projection surface 104 indicated by a double-headed arrow 152 in C of FIG. 9 is unknown. When the shape of this range is assumed to be unknown, the control apparatus 101 simply estimates the shape of the projection surface 104 only for this part whose shape is unknown.

As described thus far, by performing the processing related to the update of the correction information used for geometric correction and the like (the detection of the corresponding point of pixels between the projection unit 111 and the imaging unit 112 for a relation between the projection imaging apparatuses 102, the posture estimation for the projection imaging apparatus 102, and the shape estimation for the projection surface 104), the control apparatus 101 can suppress the execution of unnecessary processing. That is, the control apparatus 101 can suppress an increase in processing amount (processing time) of the processing related to the update of the correction information used for geometric correction and the like.

Returning to FIG. 7, for example, in a case where the shape of the projection surface 104 changes during the projection of an image such as contents, the postures of all the projection imaging apparatuses 102 are known. Meanwhile, as for the corresponding point of pixels between the projection unit 111 and the imaging unit 112 for a relation between the projection imaging apparatuses 102, a corresponding point according to a part of the projection surface 104 whose shape has changed becomes unclear. In addition, the shape of the projection surface 104 is unclear for a part thereof whose shape has changed. Therefore, the control apparatus 101 detects the corresponding point of pixels between the projection unit 111 and the imaging unit 112 for a relation between the projection imaging apparatuses 102 only for a part related to the projection imaging apparatus 102 whose corresponding point has changed. Furthermore, the control apparatus 101 estimates the shape of the projection surface 104 only for a part of the projection surface 104 whose shape becomes unknown due to the shape change. Note that, in this case, the posture estimation for the projection imaging apparatus 102 is unnecessary and thus is omitted.

As described above, by performing the processing related to the update of the correction information used for geometric correction and the like (the detection of the corresponding point of pixels between the projection unit 111 and the imaging unit 112 for a relation between the projection imaging apparatuses 102, the posture estimation for the projection imaging apparatus 102, and the shape estimation for the projection surface 104), the control apparatus 101 can suppress the execution of unnecessary processing. That is, the control apparatus 101 can suppress an increase in processing amount (processing time) of the processing related to the update of the correction information used for geometric correction and the like.

Meanwhile, for example, in a case where the posture of a part of the projection imaging apparatuses 102 changes and the shape of the projection surface 104 also changes during the projection of an image such as contents, corresponding points of pixels related to the part of the projection imaging apparatuses 102 whose posture has changed change. In addition, a corresponding point of pixels corresponding to a part of the projection surface 104 whose shape has changed also changes. The other corresponding points do not change. Therefore, in this case, the control apparatus 101 detects the corresponding point of pixels between the projection unit 111 and the imaging unit 112 for a relation between the projection imaging apparatuses 102 only for a part related to the projection imaging apparatus 102 whose posture has changed and a part related to the projection imaging apparatus 102 whose corresponding point has changed.

Furthermore, in this case, the posture changes only for the part of the projection imaging apparatuses 102 whose posture has changed but the postures of the other projection imaging apparatuses 102 do not change. Therefore, in this case, the control apparatus 101 estimates the posture only for the projection imaging apparatus 102 whose posture has changed.

Furthermore, the control apparatus 101 estimates the shape of the projection surface 104 only for a part of the projection surface 104 whose shape is unknown. It is not necessary to estimate the shape of a part whose shape is known even in a case where any of the posture change in the projection imaging apparatus 102 and the shape change in the projection surface 104 acts as a factor. That is, the shape estimation is required to be performed only for an unknown part.

As described thus far, by performing the processing related to the update of the correction information used for geometric correction and the like (the detection of the corresponding point of pixels between the projection unit 111 and the imaging unit 112 for a relation between the projection imaging apparatuses 102, the posture estimation for the projection imaging apparatus 102, and the shape estimation for the projection surface 104), the control apparatus 101 can suppress the execution of unnecessary processing. That is, the control apparatus 101 can suppress an increase in processing amount (processing time) of the processing related to the update of the correction information used for geometric correction and the like.

That is, as described thus far, by selecting processing to be executed depending on the change factor, only necessary processing according to each processing can be performed, whereby the control apparatus 101 can suppress an increase in processing amount (processing time) of the processing related to the update of the correction information used for geometric correction and the like.

<Configuration of Control Apparatus>

Figure 10:
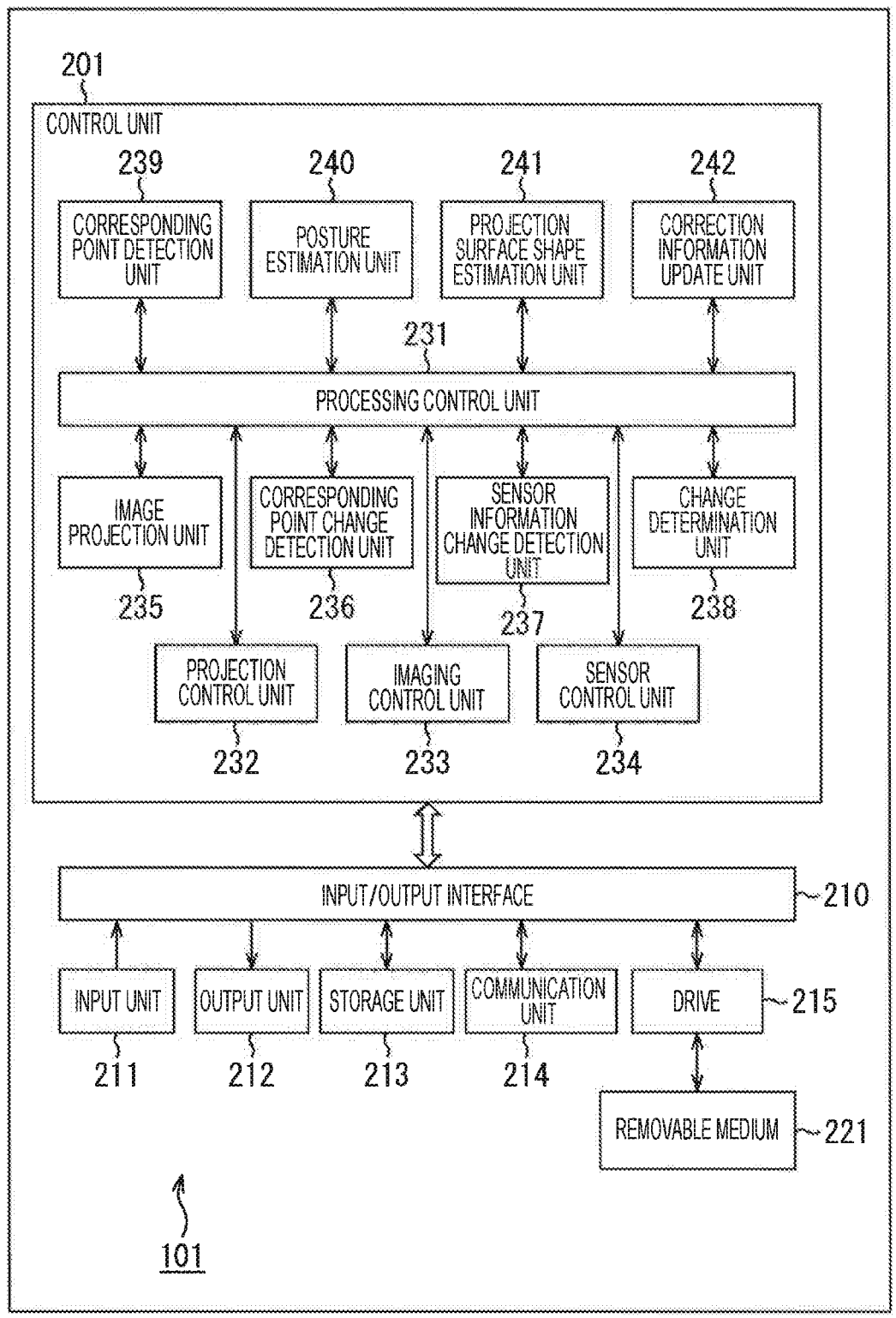
FIG. 10 is a block diagram illustrating a main configuration example of a control apparatus.

FIG. 10 is a block diagram illustrating a main configuration example of the control apparatus 101 which is an embodiment of the information processing apparatus to which the present technology is applied.

As illustrated in FIG. 10, the control apparatus 101 has a control unit 201. Processing related to the control of each member of the control apparatus 101 and the projection imaging apparatus 102, and so on are performed therein.

An input/output interface 210 is connected to the control unit 201 via a bus. An input unit 211, an output unit 212, a storage unit 213, a communication unit 214, and a drive 215 are connected to the input/output interface 210.

The input unit 211 is constituted by an input device that accepts external information such as user input. For example, the input unit 211 includes an operation button, a touch panel, a camera, a microphone, and an input terminal. In addition, various sensors such as an acceleration sensor, a light sensor, and a temperature sensor may be included in the input unit 211.

The output unit 212 is constituted by an output device that outputs information such as an image and a sound. For example, the output unit 212 includes a display, a speaker, and an output terminal.

For example, the storage unit 213 is constituted by a hard disk, a RAM disk, or a non-volatile memory. For example, the communication unit 214 is constituted by a network interface. For example, the communication unit 214 is connected to the communication cable 103 and communicates with another apparatus connected via the communication cable 103. The drive 215 drives a removable medium 221 such as a magnetic disk, an optical disc, a magneto-optical disk, or a semiconductor memory.

The control unit 201 has a processing control unit 231, a projection control unit 232, an imaging control unit 233, a sensor control unit 234, an image projection unit 235, a corresponding point change detection unit 236, a sensor information change detection unit 237, a change determination unit 238, a corresponding point detection unit 239, a posture estimation unit 240, a projection surface shape estimation unit 241, and a correction information update unit 242.

The processing control unit 231 performs processing related to the control of processing related to correction information update. The projection control unit 232 performs processing related to the control of the projection unit 111. The imaging control unit 233 performs processing related to the control of the imaging unit 112. The sensor control unit 234 performs processing related to the control of a sensor (sensor unit 312) included in each projection imaging apparatus 102.

The image projection unit 235 performs processing related to the projection of an image such as contents. The corresponding point change detection unit 236 performs processing related to the detection of a change in the corresponding point of pixels between the projection unit 111 and the imaging unit 112 for a relation between the projection imaging apparatuses 102. The sensor information change detection unit 237 performs processing related to the detection of a change in sensor information. The change determination unit 238 performs processing related to the determination as to what kind of information has changed.

The corresponding point detection unit 239 performs processing related to the detection of the corresponding point of pixels between the projection unit 111 and the imaging unit 112 for a relation between the projection imaging apparatuses 102. The posture estimation unit 240 performs processing related to the posture estimation for the projection imaging apparatus 102. The projection surface shape estimation unit 241 performs processing related to the shape estimation for the projection surface 104. The correction information update unit 242 performs processing related to the update of the correction information.

Note that each of these processing units can be also realized by software. In that case, the control unit 201 has a configuration capable of executing a program and processing data, such as a central processing unit (CPU), a read only memory (ROM), and a random access memory (RAM). Then, the control unit 201 performs various types of processing by, for example, loading a program read from the storage unit 213 or the like into a built-in RAM or the like to execute and processing data read from the storage unit 213 or the like. In this case, the respective processing units of the processing control unit 231 to the correction information update unit 242 are realized as functional blocks. That is, the control unit 201 executes a program to realize various functions of the processing control unit 231 to the correction information update unit 242.

<Appearance of Projection Imaging Apparatus>

Figure 11:
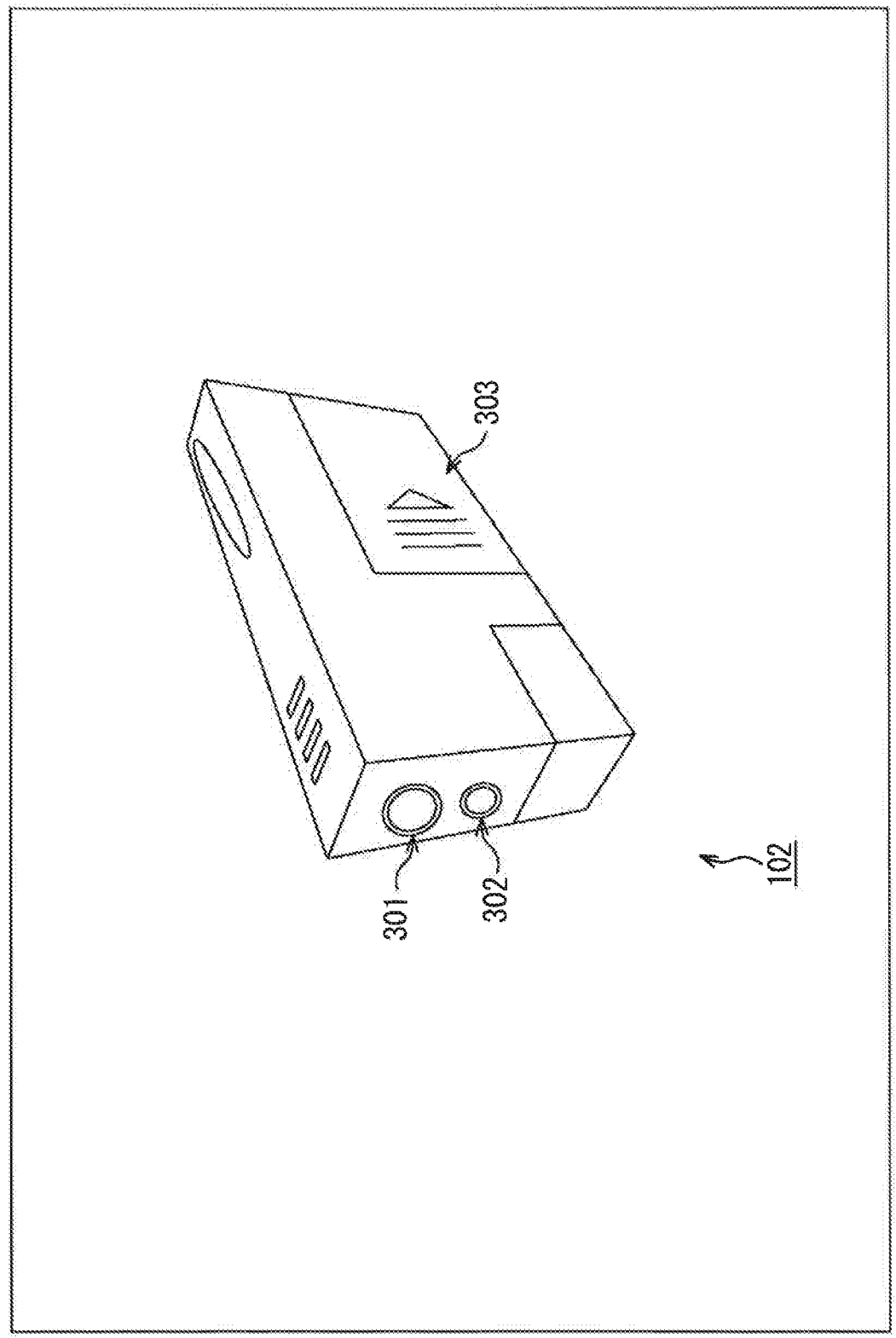
FIG. 11 is a view for explaining an example of the appearance of a projection imaging apparatus.

FIG. 11 illustrates an example of the appearance of the projection imaging apparatus 102. As described above, the projection imaging apparatus 102 has the projection unit 111 and the imaging unit 112 and optical devices such as a projection port (lens mechanism) 301 for projecting an image and an imaging port (lens mechanism) 302 for imaging a subject are provided in a cabinet thereof. In addition, the projection imaging apparatus 102 may be of any dimension but, for example, may be a portable (compact) apparatus. In that case, a battery 303 may be provided in the cabinet of the projection imaging apparatus 102 as illustrated in FIG. 11. By providing the battery 303, the projection imaging apparatus 102 can be driven without an external power supply and thus, the degree of freedom of the installation position thereof can be enhanced.

<Projection Imaging Apparatus>

Figure 12:
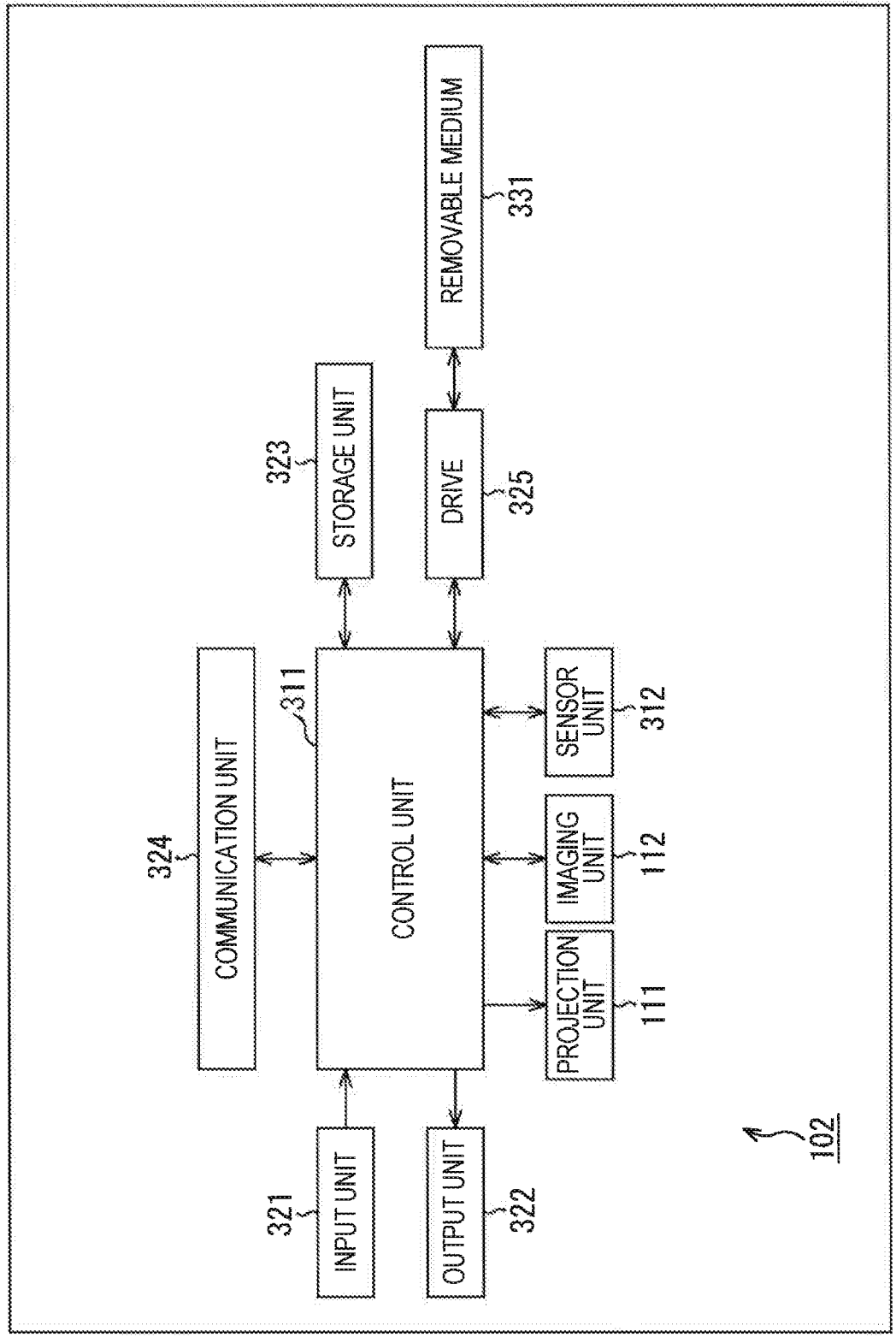
FIG. 12 is a block diagram illustrating a main configuration example of the projection imaging apparatus.

FIG. 12 is a block diagram illustrating a main configuration example of the projection imaging apparatus 102.

As illustrated in FIG. 12, the projection imaging apparatus 102 has a control unit 311, the projection unit 111, the imaging unit 112, the sensor unit 312, an input unit 321, an output unit 322, a storage unit 323, a communication unit 324, and a drive 325.

The control unit 311 has, for example, a CPU, a ROM, and a RAM to control each processing unit within the apparatus and execute various types of processing such as image processing required for the control thereof.

The sensor unit 312 has a sensor capable of detecting a change in posture of the projection imaging apparatus 102, such as an acceleration sensor or each velocity sensor. This sensor may sense any kind of information as long as the sensor can detect a change in posture of the projection imaging apparatus 102. The sensor unit 312 senses a predetermined parameter under the control of the control unit 311 and supplies a result of the detection to the control unit 311.

The projection unit 111 performs processing related to the projection of an image under the control of the control unit 311. For example, the projection unit 111 projects an image supplied from the control unit 311 on the outside of the projection imaging apparatus 102 (for example, the projection surface 104). That is, the projection unit 111 realizes a projection function. The projection unit 111 uses a laser beam as a light source and projects an image by scanning this laser beam using a MEMS mirror. As a matter of course, the light source of the projection unit 111 is arbitrary and not limited to the laser beam. The light source may be a light emitting diode (LED), xenon, or the like. Details of the projection unit 111 will be described later.

Under the control of the control unit 311, the imaging unit 112 images a subject outside the apparatus to generate a captured image and supplies this captured image to the control unit 311. That is, the imaging unit 112 realizes an imaging function. For example, the imaging unit 112 captures a projection image projected on the projection surface 104 by the projection unit 111.

The input unit 321 is constituted by an input device that accepts external information such as user input. For example, the input unit 321 includes an operation button, a touch panel, a camera, a microphone, and an input terminal. In addition, various sensors such as a light sensor and a temperature sensor may be included in the input unit 321.

The output unit 322 is constituted by an output device that outputs information such as an image and a sound. For example, the output unit 322 includes a display, a speaker, and an output terminal.

For example, the storage unit 323 is constituted by a hard disk, a RAM disk, or a non-volatile memory. For example, the communication unit 324 is constituted by a network interface. For example, the communication unit 324 is connected to the communication cable 103 and communicates with another apparatus connected via the communication cable 103. The drive 325 drives a removable medium 331 such as a magnetic disk, an optical disc, a magneto-optical disk, or a semiconductor memory.

<Projection Unit>

Figure 13:
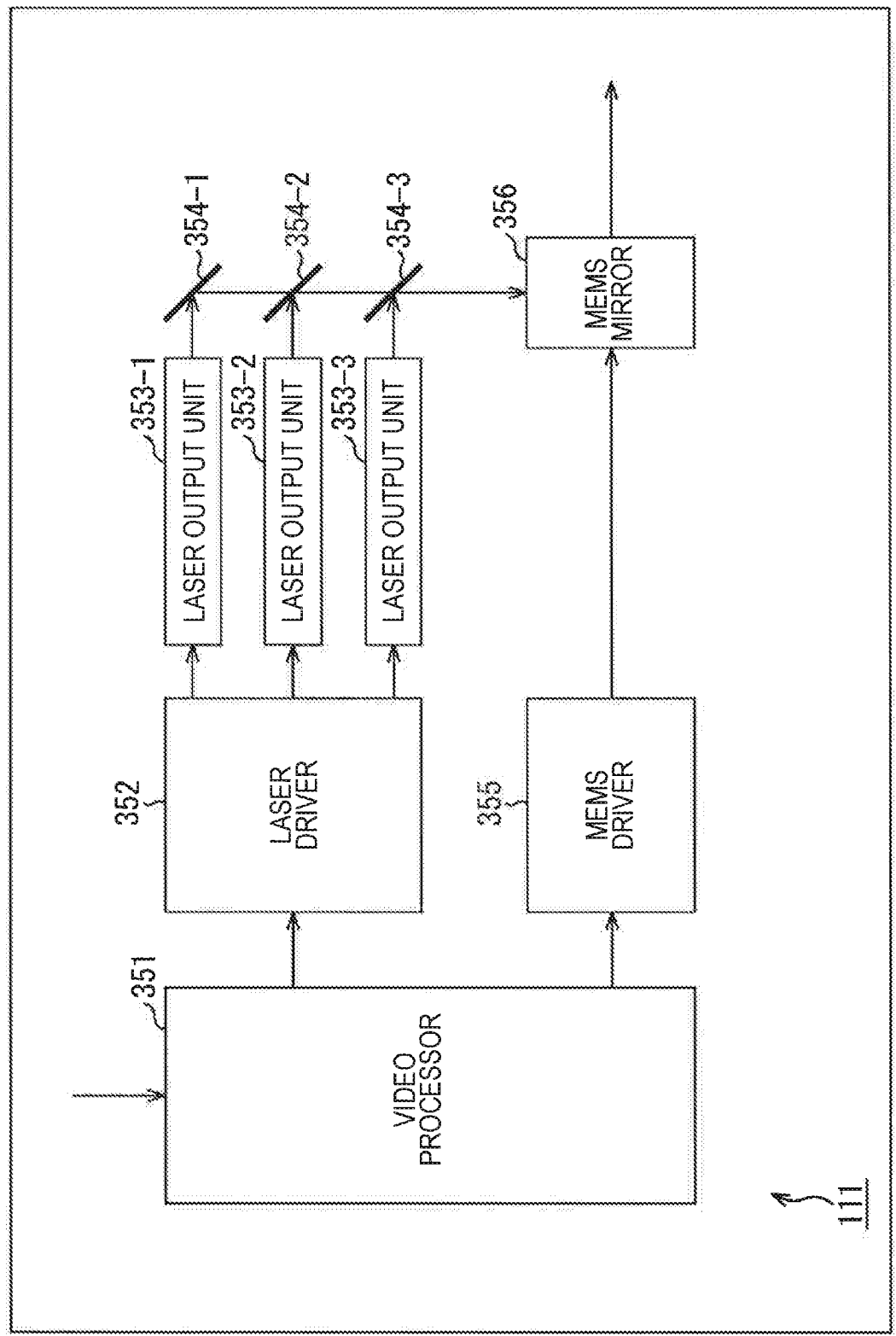
FIG. 13 is a block diagram illustrating a main configuration example of a projection unit.

FIG. 13 is a block diagram illustrating a main configuration example of the projection unit 111. As illustrated in FIG. 13, the projection unit 111 has a video processor 351, a laser driver 352, a laser output unit 353-1, a laser output unit 353-2, a laser output unit 353-3, a mirror 354-1, a mirror 354-2, a mirror 354-3, a micro electro mechanical systems (MEMS) driver 355, and a MEMS mirror 356.

The video processor 351 holds an image supplied from the control unit 311 and performs necessary image processing on this image. The video processor 351 supplies the image to be projected to the laser driver 352 and the MEMS driver 355.

The laser driver 352 controls the laser output units 353-1 to 353-3 so as to project the image supplied from the video processor 351. The laser output units 353-1 to 353-3 output laser beams, for example, having different colors (wavelength ranges) from each other such as red, blue, and green. That is, the laser driver 352 controls the laser output of each color so as to project the image supplied from the video processor 351. Note that, in a case where it is not necessary to distinguish the laser output units 353-1 to 353-3 from each other when described, these laser output units are referred to as laser output units 353.

The mirror 354-1 reflects the laser beam output from the laser output unit 353-1 to guide to the MEMS mirror 356. The mirror 354-2 reflects the laser beam output from the laser output unit 353-2 to guide to the MEMS mirror 356. The mirror 354-3 reflects the laser beam output from the laser output unit 353-3 to guide to the MEMS mirror 356.

Note that, in a case where it is not necessary to distinguish the mirrors 354-1 to 354-3 from each other when described, these mirrors are referred to as mirrors 354.

Figure 14:
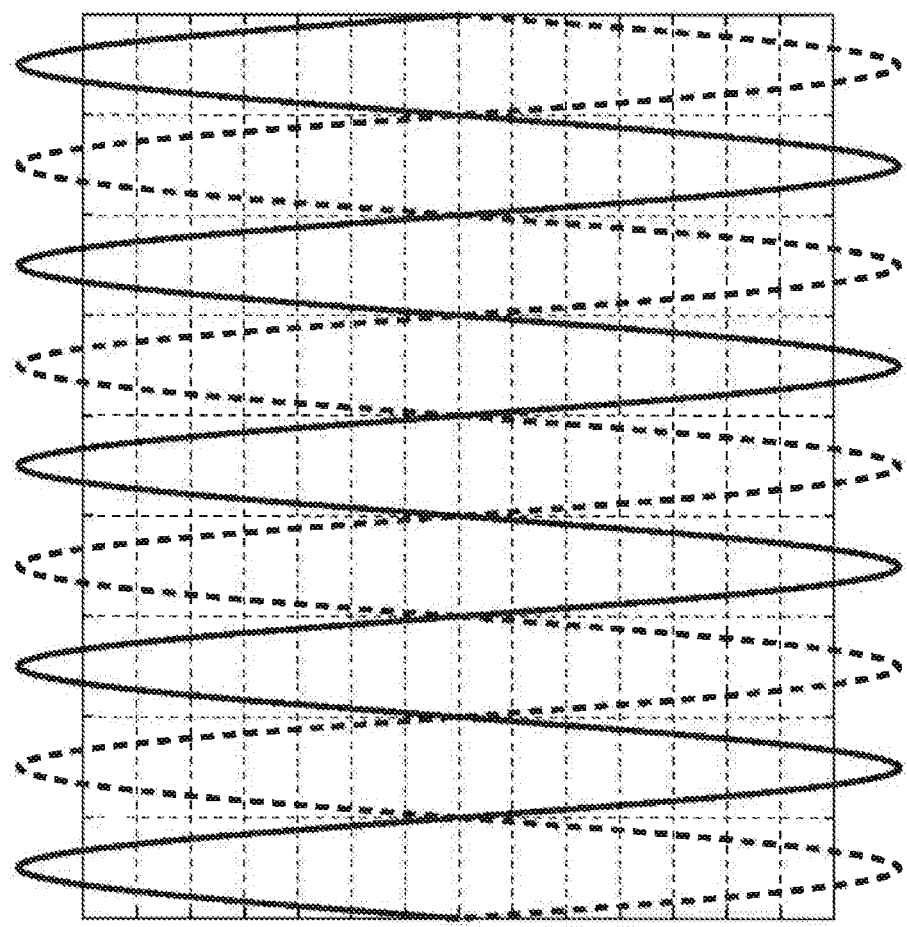
FIG. 14 is a diagram illustrating an example of scanning of a laser beam.

The MEMS driver 355 controls the driving of a mirror of the MEMS mirror 356 so as to project the image supplied from the video processor 351. The MEMS mirror 356 drives the mirror (reflector) attached on top of the MEMS in accordance with the control of the MEMS driver 355 to scan the laser beam of each color as illustrated in FIG. 14 as an example. This laser beam is output from the projection port to the outside of the apparatus and, for example, the projection surface 104 is irradiated therewith. As a result, the image supplied from the video processor 351 is projected on the projection surface 104.

Note that the example in FIG. 13 has described three laser output units 353 provided to output the laser beams of three colors but the number of laser beams (or the number of colors) is arbitrary. For example, the number of laser output units 353 may be four or more or may be two or less. That is, the number of laser beams output from the projection imaging apparatus 102 (projection unit 111) may be two or less or may be four or more. Additionally, the number of colors of laser beams output from the projection imaging apparatus 102 (projection unit 111) is also arbitrary and may be two or less or may be four or more. The configurations of the mirror 354 and the MEMS mirror 356 are also arbitrary and are not limited to the example in FIG. 13. As a matter of course, a scanning pattern of the laser beam is arbitrary.

<Flow of Correction Information Update Processing>

Next, an example of a flow of correction information update processing executed by the control unit 201 of the control apparatus 101 will be described with reference to a flowchart in FIG. 15.

The control unit 201 of the control apparatus 101 first performs the initial sensing. As described above with reference to FIG. 7, in the initial sensing, all items of the processing related to the update of the correction information used for geometric correction and the like are executed for all the projection imaging apparatuses 102. After the initial sensing is performed, the image projection unit 235 controls the projection imaging apparatus 102 via the projection control unit 232 to project an image such as contents. In accordance with this control, the control unit 311 of the projection imaging apparatus 102 controls the projection unit 111 to project an image such as contents supplied from the control apparatus 101 on the projection surface 104.

In parallel with this image projection, the control apparatus 101 performs the correction information update processing to update the correction information used for geometric correction and the like as necessary. This correction information update processing is executed for each projection imaging apparatus 102. Note that the correction information update processing may be perform on the projection imaging apparatus 102 one by one or the correction information update processing may be performed on the plurality of projection imaging apparatuses 102 in parallel. In addition, a processing order thereof is arbitrary and may be a fixed order or random. The correction information update processing is only required to be performed on all the projection imaging apparatuses 102.

Once such correction information update processing is started, the corresponding point change detection unit 236 detects, in step S101, a change in the corresponding point of pixels between the projection unit 111 and the imaging unit 112 for a relation between a current projection imaging apparatus 102 being processed and another projection imaging apparatus 102. The corresponding point change detection unit 236 controls the projection control unit 232 and the imaging control unit 233 to perform this detection processing. That is, the corresponding point change detection unit 236 acquires an image projected by the projection unit 111 from the projection control unit 232. In addition, the corresponding point change detection unit 236 causes the projection imaging apparatus 102 via the imaging control unit 233 to image the projection surface 104 and acquires a captured image thereof. The corresponding point change detection unit 236 aligns the positions of these images to monitor a change in the corresponding point of pixels between the projection unit 111 and the imaging unit 112 for a relation between the current projection imaging apparatus 102 and the another projection imaging apparatus 102 and, in a case Where the corresponding point has changed, detects this change.

In step S102, the sensor information change detection unit 237 detects a change in sensor information obtained by the sensor unit 312 of the current projection imaging apparatus 102. The sensor information change detection unit 237 controls the sensor control unit 234 to perform this detection processing. That is, the sensor information change detection unit 237 acquires a sensor output from the sensor unit 312 of the current projection imaging apparatus 102 via the sensor control unit 234. Then, on the basis of this sensor output, the sensor information change detection unit 237 detects a change in sensor information in a time direction.

In step S103, the change determination unit 238 determines whether the posture of the current projection imaging apparatus 102 has changed. In a case where a change in sensor information is detected in step S102 and it is determined that the posture of the current projection imaging apparatus 102 has changed, the processing proceeds to step S104.

In step S104, the corresponding point detection unit 239 detects the corresponding point of pixels related to the current projection imaging apparatus 102.

In step S105, the posture estimation unit 240 estimates the posture of the current projection imaging apparatus 102 using a processing result of step S104 (pixel corresponding point detection result). Namely, the posture estimation unit 240 estimates the relative posture of the current projection imaging apparatus 102 with respect to another projection imaging apparatus 102 whose posture has not changed.

In step S106, the projection surface shape estimation unit 241 estimates the shape of the projection surface 104. Once the processing in step S106 is terminated, the processing proceeds to step S110.

Meanwhile, in a case where no change in sensor information is detected in step S102 and it is determined in step S103 that the posture of the current projection imaging apparatus 102 has not changed, the processing proceeds to step S107.

In step S107, the change determination unit 238 determines whether the shape of the projection surface 104 has changed on the basis of a processing result of step S101. For example, in a case where the corresponding point of pixels related to the current projection imaging apparatus 102 has changed even though the posture of the current projection imaging apparatus 102 has not changed, the shape of the projection surface 104 has changed. In a case where it is determined that the shape of the projection surface 104 has changed in this manner, the processing proceeds to step S108.

In step S108, the corresponding point detection unit 239 detects the corresponding point of pixels related to the current projection imaging apparatus 102. Note that, in this case, since the posture of the current projection imaging apparatus 102 has not changed, the estimation of the posture is omitted.

In step S109, the projection surface shape estimation unit 241 estimates the shape of the projection surface 104. Once the processing in step S109 is terminated, the processing proceeds to step S110.

In step S110, in a case where information has been updated, added, or deleted during the respective items of the above processing, the correction information update unit 242 updates the correction information so as to reflect the update, addition, or deletion of the information in the correction information.

Once the processing in step S110 is terminated, the correction information update processing is terminated. In addition, in a case where it is determined in step S107 that the shape of the projection surface 104 has not changed, the correction information update processing is terminated. In this case, the posture of the current projection imaging apparatus 102 has not changed and also the shape of a part of the projection surface 104 associated with the current projection imaging apparatus 102 has not changed. Therefore, the processing related to the update of the correction information used for geometric correction and the like is all omitted.

As described above, in step S104, the corresponding point detection unit 239 detects the corresponding point between a pixel of the projection unit 111 and a pixel of the imaging unit 112 for a relation between the projection imaging apparatus 102 whose posture has changed and the projection imaging apparatus 102 whose posture has not changed. Then, in step S105, the posture estimation unit 240 estimates the relative posture of the projection imaging apparatus 102 whose posture has changed with respect to the projection imaging apparatus 102 whose posture has not changed on the basis of that detected corresponding point of pixels.

Therefore, the control apparatus 101 can suppress the execution of unnecessary processing by, for example, omitting the estimation of the relative posture between the projection imaging apparatuses 102 whose postures have not changed. That is, the control apparatus 101 can suppress an increase in processing amount (processing time) of the processing related to the update of the correction information used for geometric correction and the like.

In addition, in step S101, the corresponding point change detection unit 236 detects a change in the corresponding point between a pixel of the projection unit 111 and a pixel of the imaging unit 112 of the projection imaging apparatuses 102. Then, in step S102, the sensor information change detection unit 237 detects a posture change in the projection imaging apparatus on the basis of the sensor output from the sensor unit which is included in the projection imaging apparatus 102 and detects at least one of the position and the direction. Furthermore, in step S103, on the basis of the detection result of the corresponding point change detection unit 236 and the detection result of the sensor information change detection unit 237, the change determination unit 238 determines whether the posture of the projection imaging apparatus 102 has changed.

Then, in step S104, the corresponding point detection unit 239 detects the corresponding point for a relation between the projection imaging apparatus 102 whose posture is determined by the change determination unit 238 to have changed and the projection imaging apparatus 102 whose posture is determined by the change determination unit 238 to have not changed. In addition, in step S105, the posture estimation unit 240 estimates the relative posture of the projection imaging apparatus 102 whose posture is determined by the change determination unit 238 to have changed, with respect to the projection imaging apparatus 102 whose posture is determined by the change determination unit 238 to have not changed.

Therefore, the control apparatus 101 can suppress the execution of unnecessary processing by, for example, omitting the estimation of the relative posture between the projection imaging apparatuses 102 whose postures have not changed. That is, the control apparatus 101 can suppress an increase in processing amount (processing time) of the processing related to the update of the correction information used for geometric correction and the like.

Additionally, in step S104, the corresponding point detection unit 239 further detects the corresponding point between a pixel of the projection unit 111 and a pixel of the imaging unit 112 of the projection imaging apparatus 102 whose posture has changed. Then, in step S106, the projection surface shape estimation unit 241 estimates the shape of the projection surface 104 on the basis of the corresponding point detected by the corresponding point detection unit 239 for a relation between a pixel of the projection unit 111 and a pixel of the imaging unit 112 of the projection imaging apparatus 102 whose posture has changed.

Therefore, the control apparatus 101 can estimate the shape by specifying an area of the projection image having a possibility of including a part whose shape is unknown, such as a projection range responsible by the projection imaging apparatus 102 whose posture has changed, thereby being able to suppress the execution of unnecessary processing by, for example, omitting the shape estimation for a part whose shape is obviously known. That is, the control apparatus 101 can suppress an increase in processing amount (processing time) of the processing related to the update of the correction information used for geometric correction and the like.

In addition, in step S108, the corresponding point detection unit 239 further detects the corresponding point between a pixel of the projection unit 111 and a pixel of the imaging unit 112 of the projection imaging apparatus 102 whose posture has not changed. Furthermore, the projection surface shape estimation unit 241 is caused to estimate the shape of the projection surface 104 on the basis of the corresponding point detected by the corresponding point detection unit 239 for a relation between a pixel of the projection unit 111 and a pixel of the imaging unit 112 of the projection imaging apparatus 102 whose posture has not changed.

By processing in such a manner, the control apparatus 101 detects a shape change in the projection surface 104 from a change in the corresponding point of pixels even in a case where the posture of the projection imaging apparatus 102 does not change and thus can estimate the shape of the projection surface that has changed. Therefore, the execution of unnecessary processing can be suppressed by, for example, omitting the shape estimation for a part whose shape is obviously known. That is, the control apparatus 101 can suppress an increase in processing amount (processing time) of the processing related to the update of the correction information used for geometric correction and the like.

In other words, the corresponding point detection unit 239 of the control apparatus 101 detects the corresponding point between a pixel of the projection unit 111 and a pixel of the imaging unit 112 of the projection imaging apparatus 102 whose posture has not changed and the projection surface shape estimation unit 241 estimates the shape of the projection surface 104 on the basis of the corresponding point detected by this corresponding point detection unit 239 for a relation between a pixel of the projection unit 111 and a pixel of the imaging unit 112 of the projection imaging apparatus 102 whose posture has not changed.

By processing in this manner, the control apparatus 101 can specify a part of the projection surface 104 whose shape has changed and estimate the shape of the projection surface 104 for this part. Therefore, the execution of unnecessary processing can be suppressed by, for example, omitting the shape estimation for a part whose shape is obviously known. That is, the control apparatus 101 can suppress an increase in processing amount (processing time) of the processing related to the update of the correction information used for geometric correction and the like.

<Flow of Corresponding Point Detection Processing>

Next, an example of a flow of corresponding point detection processing executed in step S104 of FIG. 15 will be described with reference to a flowchart in FIG. 16.

Once the corresponding point detection processing is started, the corresponding point detection unit 239 controls, in step S131, the projection unit 111 of another projection imaging apparatus 102 which is not the processing target via the projection control unit 232 to project a predetermined pattern image.

In step S132, the corresponding point detection unit 239 controls the imaging unit 112 of the current projection imaging apparatus 102 via the imaging control unit 233 to capture the projection image (pattern image) projected by the processing in step S131.

In step S133, the corresponding point detection unit 239 detects the corresponding point between a pixel of the projection unit 111 of the another projection imaging apparatus 102 and a pixel of the imaging unit 112 of the current projection imaging apparatus 102. That is, on the basis of the pattern image projected during the processing in step S131 and the captured image (captured image including the pattern image) obtained through the imaging during the processing in step S132, the corresponding point detection unit 239 detects this corresponding point.

In step S134, the corresponding point detection unit 239 controls the projection unit 111 of the current projection imaging apparatus 102 via the projection control unit 232 to project a predetermined pattern image.

In step S135, the corresponding point detection unit 239 controls the imaging unit 112 of the current projection imaging apparatus 102 via the imaging control unit 233 to capture the projection image (pattern image) projected by the processing in step S134.

In step S136, the corresponding point detection unit 239 detects the corresponding point between a pixel of the projection unit 111 and a pixel of the imaging unit 112 of the current projection imaging apparatus 102. That is, on the basis of the pattern image projected during the processing in step S134 and the captured image (captured image including the pattern image) obtained through the imaging during the processing in step S135, the corresponding point detection unit 239 detects this corresponding point.

Figure 15:
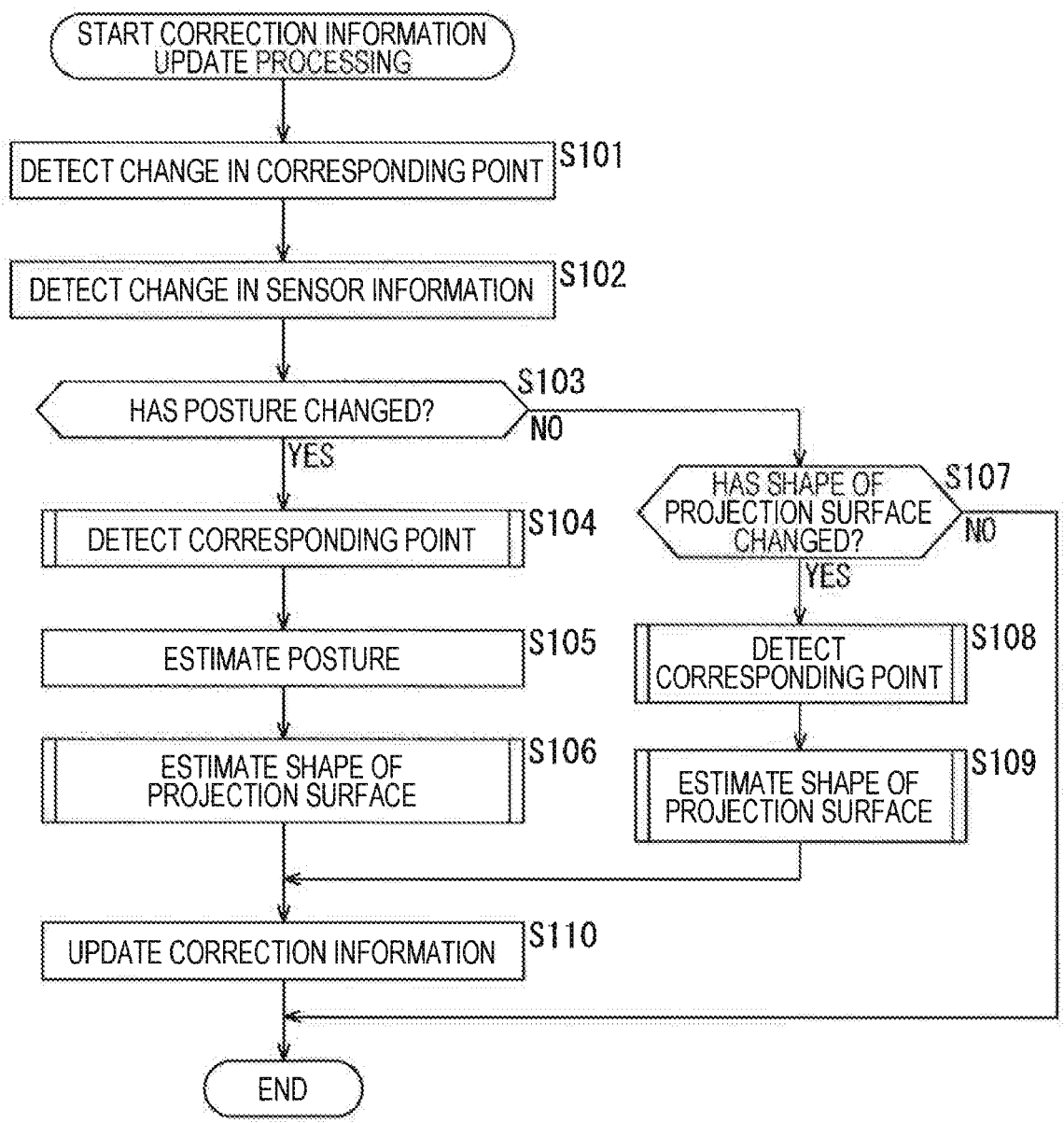
FIG. 15 is a flowchart for explaining an example of a flow of correction information update processing.
Figure 16:
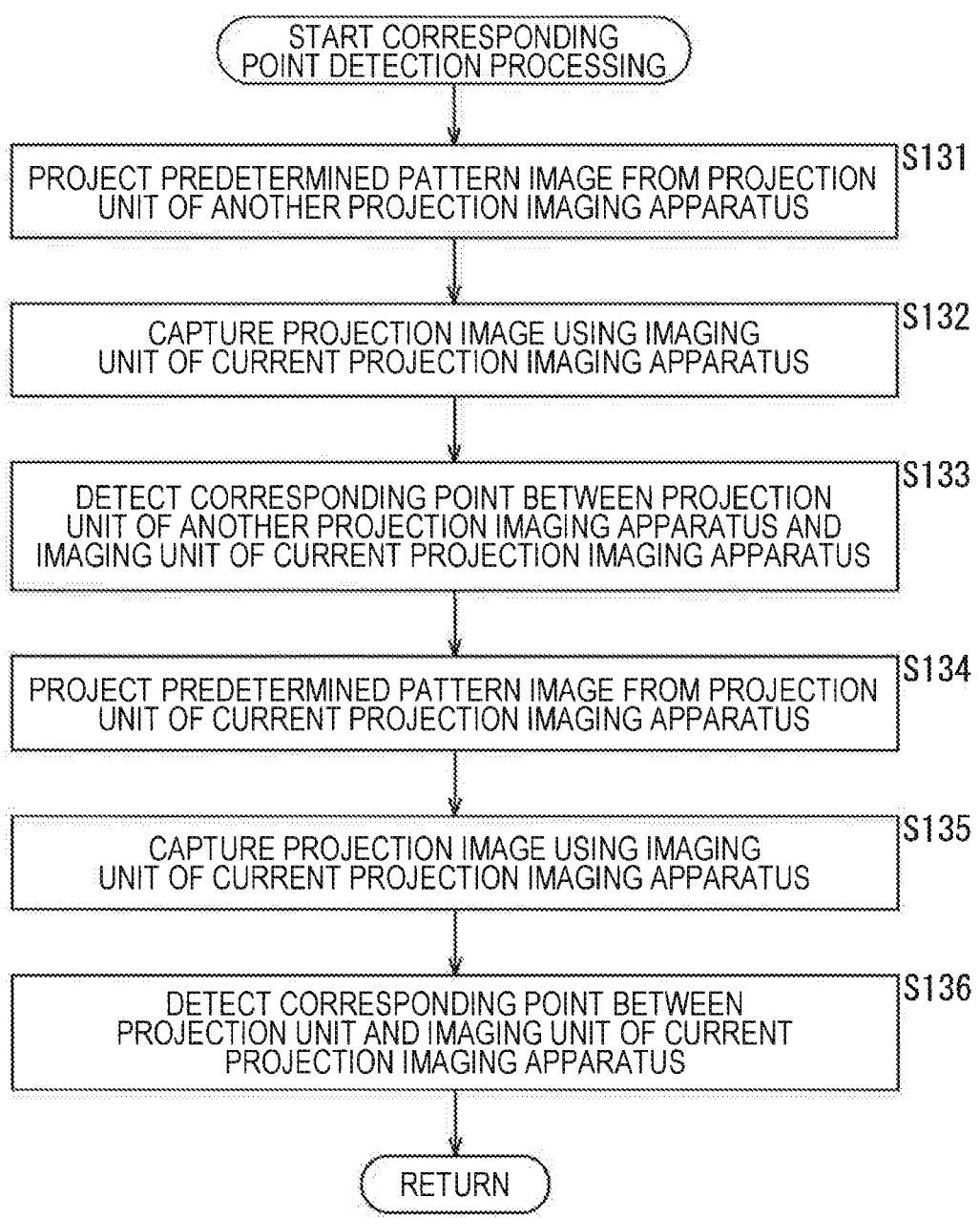
FIG. 16 is a flowchart for explaining an example of a flow of corresponding point detection processing.

When the pixel corresponding point is detected as described above, the corresponding point detection processing is terminated and the processing returns to FIG. 15.

As described thus far, the corresponding point detection unit 239 detects the corresponding point of pixels between the imaging unit 112 of the projection imaging apparatus 102 whose posture has changed and the projection unit 111 of the projection imaging apparatus 102 whose posture has not changed and also detects the corresponding point of pixels between the projection unit 111 and the imaging unit 112 of the projection imaging apparatus 102 whose posture has changed. As a result, in the correction information update processing (FIG. 15), the posture estimation unit 240 can estimate the posture of the projection imaging apparatus 102 whose posture has changed and also can estimate the shape of the projection surface 104. That is, the control apparatus 101 can suppress an increase in processing amount (processing time) of the processing related to the update of the correction information used for geometric correction and the like.

<Flow of Projection Surface Shape Estimation Processing>

Figure 17:
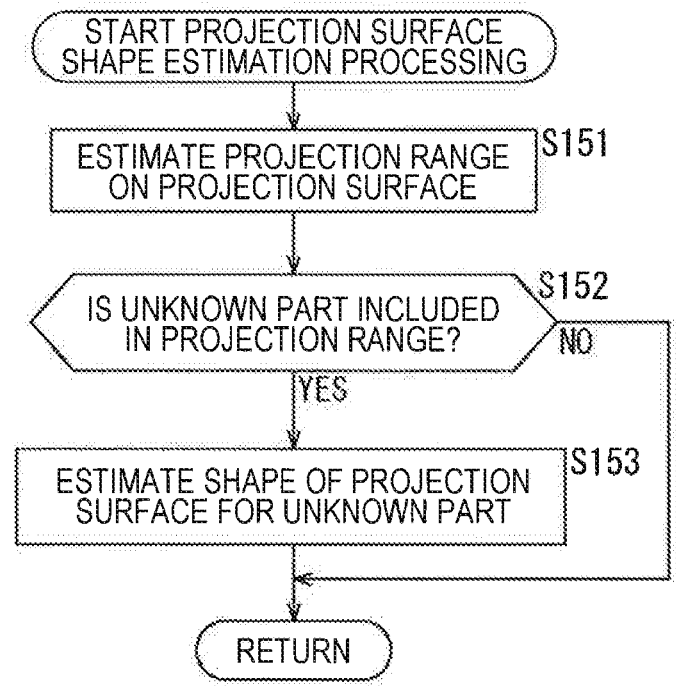
FIG. 17 is a flowchart for explaining an example of a flow of projection surface shape estimation processing.

Next, an example of a flow of projection surface shape estimation processing executed in step S106 of FIG. 15 will be described with reference to a flowchart in FIG. 17.

Once the projection surface shape estimation processing is started, the projection surface shape estimation unit 241 controls the projection control unit 232 in step S151 to estimate a projection range on the projection surface 104 on which the projection unit 111 of the current projection imaging apparatus 102 projects an image. For example, the projection surface shape estimation unit 241 estimates the above-mentioned projection range on the basis of the posture of the current projection imaging apparatus 102 estimated by the processing in step S105 (FIG. 15), and so on.

In step S152, the projection surface shape estimation unit 241 determines whether an unknown part of the projection surface 104 is included in this estimated projection range. In a case where it is determined that an unknown part is included, the processing proceeds to step S153.

In step S153, the projection surface shape estimation unit 241 estimates the shape of the projection surface 104 for this unknown part. For example, on the basis of the pixel corresponding point between the projection unit 111 and the imaging unit 112 of the current projection imaging apparatus 102 detected by the processing in step S136 (FIG. 16), the projection surface shape estimation unit 241 estimates the shape of the projection surface 104 for this unknown part.

Once the shape of the projection surface 104 is estimated, the projection surface shape estimation processing is terminated and the processing returns to FIG. 15. In addition, in a case where it is determined in step S152 that an unknown part is not included in the projection range, the projection surface shape estimation processing is terminated and the processing returns to FIG. 15. That is, in this case, the processing in step S153 (projection surface shape estimation) is omitted.

As described thus far, the projection surface shape estimation unit 241 estimates the shape of the projection surface 104 for a part of the projection surface 104 whose shape is unknown within a range on which an image is projected by the projection unit 111 of the projection imaging apparatus 102 whose posture has changed. Therefore, the control apparatus 101 can further suppress an increase in processing amount (processing time) of the processing related to the update of the correction information used for geometric correction and the like.

<Flow of Corresponding Point Detection Processing>

Next, an example of a flow of corresponding point detection processing executed in step S108 of FIG. 15 will be described with reference to a flowchart in FIG. 18.

Once the corresponding point detection processing is started, the corresponding point detection unit 239 controls, in step S171, the projection unit 111 of the current projection imaging apparatus 102 via the projection control unit 232 to project a predetermined pattern image.

In step S172, the corresponding point detection unit 239 controls the imaging unit 112 of the current projection imaging apparatus 102 via the imaging control unit 233 to capture the projection image (pattern image) projected by the processing in step S171.

In step S173, the corresponding point detection unit 239 detects the corresponding point between a pixel of the projection unit 111 and a pixel of the imaging unit 112 of the current projection imaging apparatus 102. That is, on the basis of the pattern image projected during the processing in step S171 and the captured image (captured image including the pattern image) obtained through the imaging during the processing in step S172, the corresponding point detection unit 239 detects this corresponding point.

When the pixel corresponding point is detected as described above, the corresponding point detection processing is terminated and the processing returns to FIG. 15.

That is, in this case, since the posture of the current projection imaging apparatus 102 has not changed, the estimation of the posture of this projection imaging apparatus 102 is omitted. Therefore, the processing related to the detection of the corresponding point of pixels between the projection unit 111 and the imaging unit 112 for a relation between the projection imaging apparatuses 102 used for the above posture estimation (respective items of the processing in steps S131 to S133 in FIG. 16) is also omitted. Therefore, the control apparatus 101 can further suppress an increase in processing amount (processing time) of the processing related to the update of the correction information used for geometric correction and the like.

<Flow of Projection Surface Shape Estimation Processing>

Next, an example of a flow of projection surface shape estimation processing executed in step S109 of FIG. 15 will be described with reference to a flowchart in FIG. 19.

Figure 18:
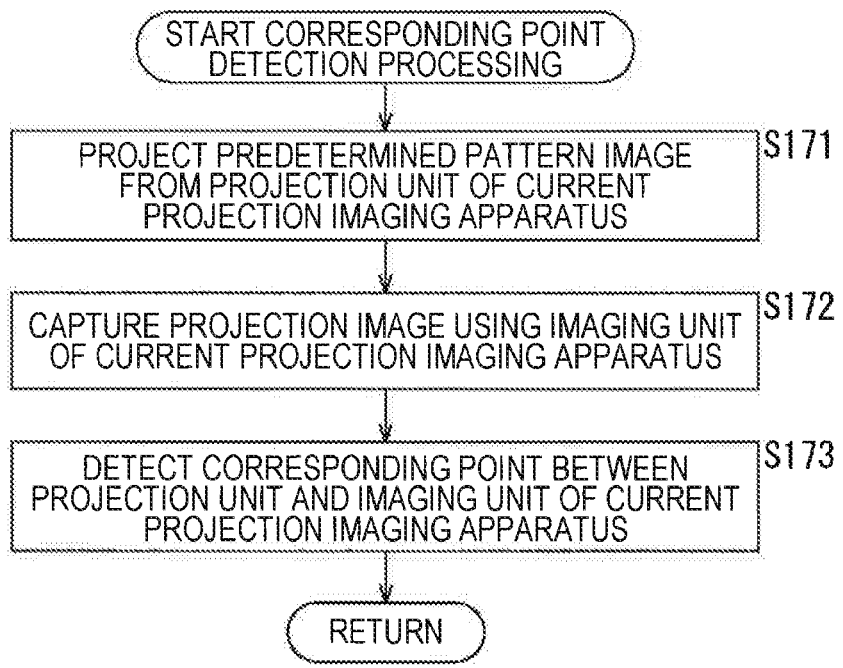
FIG. 18 is a flowchart for explaining an example of a flow of corresponding point detection processing.

Once the projection surface shape estimation processing is started, the projection surface shape estimation unit 241 specifies, in step S191, a changed part of the corresponding points of pixels between the projection unit 111 and the imaging unit 112 of the current projection imaging apparatus 102 on the basis of a processing result of step S173 (FIG. 18).

In step S192, the projection surface shape estimation unit 241 estimates the shape of the projection surface 104 for a part of the projection surface 104 whose shape is unknown (a changed part of the corresponding points of pixels specified in step S191). This processing is executed similarly to the case of the processing in step S153 (FIG. 17). Once the shape of the projection surface 104 is estimated, the projection surface shape estimation processing is terminated and the processing returns to FIG. 15.

As described thus far, the projection surface shape estimation unit 241 estimates the shape of the projection surface 104 for a part thereof whose shape is unknown. Therefore, the control apparatus 101 can further suppress an increase in processing amount (processing time) of the processing related to the update of the correction information used for geometric correction and the like.

By executing each item of the processing as described above, the control apparatus 101 can perform only processing according to the change factor and thus can suppress an increase in processing amount of the processing related to the update of the correction information used for geometric correction and the like.

2. Second Embodiment

<Corresponding Point Detection Processing>

Note that the above explanation has described that, when the corresponding point of pixels between the projection unit 111 and the imaging unit 112 is found for a relation between the projection imaging apparatuses 102, the pattern image is projected from the projection unit 111 of another projection imaging apparatus 102 such that the imaging unit 112 of the current projection imaging apparatus 102 captures this projection image. However, the projection and the capturing of the images in this case may be reversed. Namely, the pattern image may be projected from the projection unit 111 of the current projection imaging apparatus 102 and this projection image may be captured by the imaging unit 112 of another projection imaging apparatus 102. That is, the corresponding point between a pixel of the imaging unit 112 of another projection imaging apparatus 102 and a pixel of the projection unit 111 of the current projection imaging apparatus 102 may be detected. The posture of the current projection imaging apparatus 102 can be estimated also from this corresponding point similarly to the case of the first embodiment.

An example of a flow of corresponding point detection processing executed in step S104 of FIG. 15 in that case will be described with reference to a flowchart in FIG. 20.

Once the corresponding point detection processing is started, a corresponding point detection unit 239 controls, in step S211, a projection unit 111 of a current projection imaging apparatus 102 via a projection control unit 232 to project a predetermined pattern image.

In step S212, the corresponding point detection unit 239 controls the imaging unit 112 of the current projection imaging apparatus 102 and the imaging unit 112 of another projection imaging apparatus 102 that is not the processing target via the imaging control unit 233 to individually capture the projection image (pattern image projected by the processing in step S211.

In step S213, the corresponding point detection unit 239 detects the corresponding point between a pixel of the imaging unit 112 of the another projection imaging apparatus 102 and a pixel of the projection unit 111 of the current projection imaging apparatus 102. That is, on the basis of the pattern image projected during the processing in step S211 and the captured images (captured images including the pattern image) obtained through the imaging during the processing in step S212, the corresponding point detection unit 239 detects this corresponding point.

In step S214, the corresponding point detection unit 239 detects the corresponding point between a pixel of the projection unit 111 and a pixel of the imaging unit 112 of the current projection imaging apparatus 102. That is, on the basis of the pattern image projected during the processing in step S211 and the captured images (captured images including the pattern image) obtained through the imaging during the processing in step S212, the corresponding point detection unit 239 detects this corresponding point.

When the pixel corresponding point is detected as described above, the corresponding point detection processing is terminated and the processing returns to FIG. 15.

That is, the corresponding point detection unit 239 detects the corresponding point between a pixel of the projection unit 111 of the projection imaging apparatus 102 whose posture has changed and a pixel of the imaging unit 112 of the projection imaging apparatus 102 whose posture has not changed. Also in this case, similarly to the case of the first embodiment, the control apparatus 101 can perform only processing according to the change factor and thus can suppress an increase in processing amount of the processing related to the update of the correction information used for geometric correction and the like.

3. Third Embodiment

<Configuration Example of Projection Imaging System>

Note that the configuration examples of the projection imaging apparatus and the projection imaging system to which the present technology is applied is not limited to the examples described above. For example, as in a projection imaging system 400 illustrated in A of FIG. 21, the control apparatus 101 may be omitted. That is, the processing related to the update of the correction information used for geometric correction and the like may be performed by an apparatus other than the control apparatus 101. For example, the projection imaging apparatus 102 may perform the processing.

Figure 21:
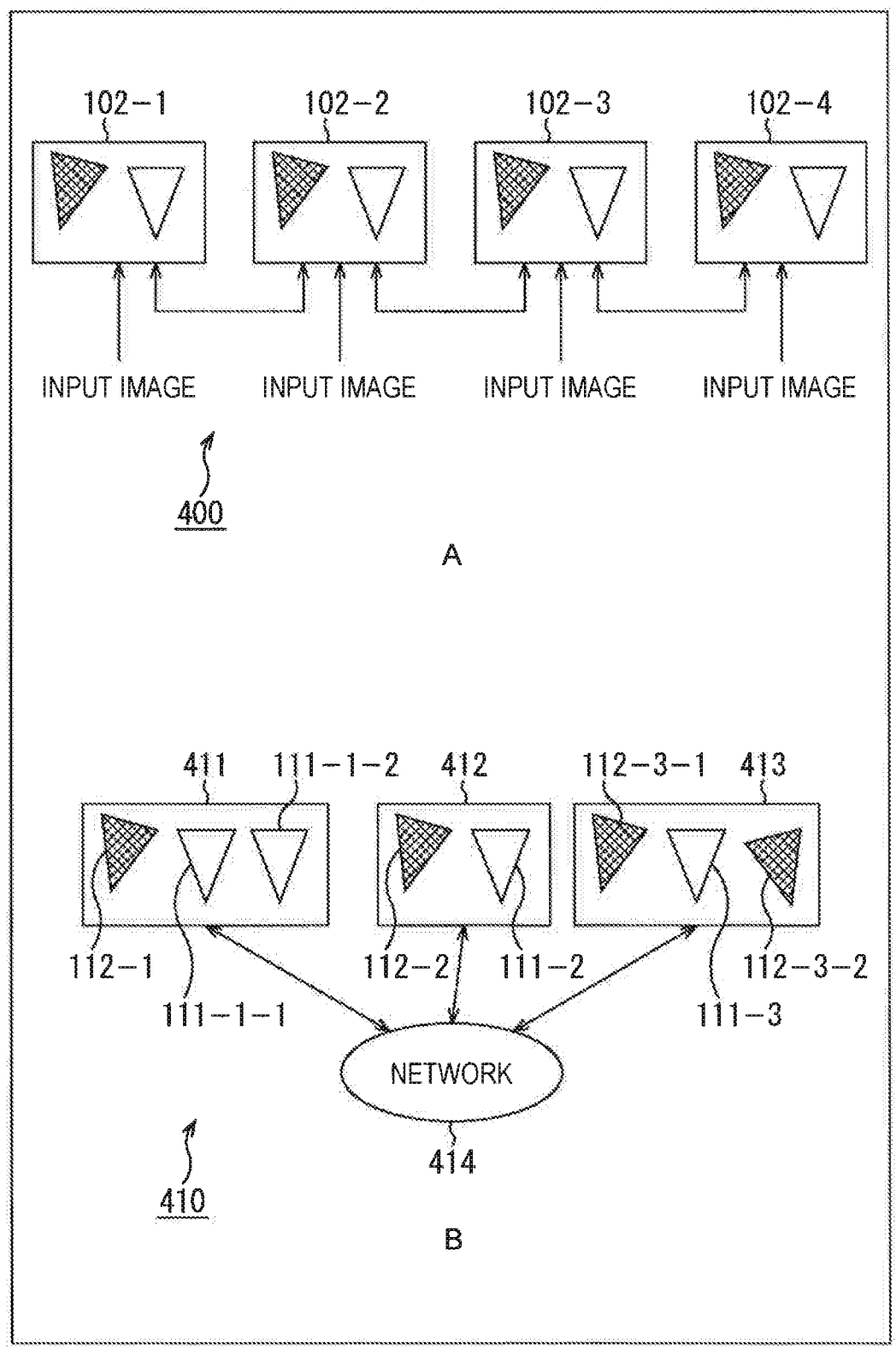
FIG. 21 is a diagram illustrating another configuration example of the projection imaging system.

In the example in A of FIG. 21, the projection imaging apparatus 102 performs the above-described processing related to the update of the correction information used for geometric correction and the like. In this case, an input image is input to each projection imaging apparatus 102 and the correction of the image is performed in each projection imaging apparatus 102. The projection imaging apparatuses 102 are connected to each other through a communication cable such as an HDMI (registered trademark) cable and various types of information are shared among these projection imaging apparatuses 102. Therefore, any projection imaging apparatus 102 can perform the above-described processing related to the update of the correction information used for geometric correction and the like.

For example, one of the projection imaging apparatuses 102-1 to 102-4 may perform the above-described processing related to the update of the correction information used for geometric correction and the like so as to share a result of this processing with the other projection imaging apparatuses 102. In addition, the plurality of projection imaging apparatuses 102 may collaborate to perform the above-described processing related to the update of the correction information used for geometric correction and the like such that a result of this processing is shared by the respective projection imaging apparatuses 102.

As described thus far, even in a case where the projection imaging apparatus performs the processing related to the update of the correction information used for geometric correction and the like, the processing can be performed in a similar manner to the cases of the first embodiment and the second embodiment.

That is, the projection imaging apparatus is configured to include the projection unit 111 that projects an image on the projection surface 104; the imaging unit 112 that images the projection surface 104; the sensor unit 312 that detects at least one of a position and a direction; the change determination unit 238 that determines whether a posture has changed on the basis of a sensor output from this sensor unit 312; the corresponding point detection unit 239 that detects, in a case where the change determination unit 238 determines that the posture has changed, a corresponding point between a pixel of the projection unit 111 and a pixel of the imaging unit 112 for a relation with another projection imaging apparatus 102 which includes the projection unit 111, the imaging unit 112, and the sensor unit 312 and whose posture has not changed; and the posture estimation unit 240 that estimates a relative posture with respect to the another projection imaging apparatus 102 on the basis of the corresponding point detected by the corresponding point detection unit 239.

As a result, the control apparatus 101 can perform only processing according to the change factor and thus can suppress an increase in processing amount of the processing related to the update of the correction information used for geometric correction and the like.

Note that the corresponding point detection unit 239 may detect the corresponding point between a pixel of the projection unit 111 of another projection imaging apparatus 102 and a pixel of the own imaging unit 112 of the projection imaging apparatus 102.

Alternatively, the corresponding point detection unit 239 may detect the corresponding point between a pixel of the own projection unit 111 of the projection imaging apparatus 102 and a pixel of the imaging unit 112 of another projection imaging apparatus 102.

Additionally, the corresponding point change detection unit 236 that detects a change in the corresponding point between a pixel of the own projection unit 111 and a pixel of the own imaging unit 112 of the projection imaging apparatus 102; and the sensor information change detection unit 237 that detects an own posture change in the projection imaging apparatus 102 on the basis of a sensor output from the sensor unit 312 may be further included, in which the change determination unit 238 may be configured to determine whether an own posture of the projection imaging apparatus 102 has changed on the basis of a detection result of the corresponding point change detection unit 236 and a detection result of the sensor information change detection unit 237.

In addition, the corresponding point detection unit 239 may further detect the corresponding point between a pixel of the own projection unit 111 and a pixel of the own imaging unit 112 of the projection imaging apparatus 102. Furthermore, the projection surface shape estimation unit 241 that estimate the shape of the projection surface 104 on the basis of the corresponding point detected by the corresponding point detection unit 239 for a relation between a pixel of the own projection unit 111 and a pixel of the own imaging unit 112 of the projection imaging apparatus 102 may be further included.

The projection surface shape estimation unit 241 may estimate the shape of the projection surface 104 for a part of the projection surface 104 whose shape is unknown within a range on which an image is projected by the own projection unit 111 of the projection imaging apparatus 102.

Meanwhile, the projection unit that projects an image on the projection surface; the imaging unit that images the projection surface; the sensor unit 312 that detects at least one of a position and a direction, the change determination unit 238 that determines whether a posture has changed on the basis of a sensor output from the sensor unit 312; the corresponding point detection unit 239 that detects, in a case where the change determination unit 238 determines that the posture has not changed, a corresponding point between a pixel of the own projection unit 111 and a pixel of the own imaging unit 112 of the projection imaging apparatus 102; and the projection surface shape estimation unit 241 that estimates a shape of the projection surface 104 on the basis of the corresponding point detected by the corresponding point detection unit 239 may be included.

By configuring as described above, even in a case where the projection imaging apparatus performs the processing related to the update of the correction information used for geometric correction and the like, the processing can be performed in a similar manner to the cases of the first embodiment and the second embodiment.

In addition, as in a projection imaging system 410 illustrated in B of FIG. 21, the configurations of the respective projection imaging apparatuses may be different from each other. As illustrated in B of FIG. 21, the projection imaging system 410 has a projection imaging apparatus 411, a projection imaging apparatus 412, and a projection imaging apparatus 413 that are connected to a network 302 which is an arbitrary communication medium network so as to be able to communicate therewith.

The projection imaging apparatus 411 has two projection units 111. (projection units 111-1-1 and 111-1-2) and one imaging unit 112-1. The projection imaging apparatus 412 has one projection unit 111-2 and one imaging unit 112-2. The projection imaging apparatus 413 has one projection unit 111-3 and two imaging units 112 (imaging units 112-3-1 and 112-3-2).

Even in a case where the configurations of the respective projection imaging apparatuses are different from each other as described above, the processing can be performed in a similar manner to the cases of the first embodiment and the second embodiment. That is, also in the case of this projection imaging system 410, an increase in processing amount of the processing related to the update of the correction information used for geometric correction and the like can be suppressed.

<Software>

A series of the above-described items of processing can be executed by hardware as well and also can be executed by software. In a case where the series of the above-described items of processing is executed by software, a program constituting this software is installed from a network or a recording medium.

For example, in the case of the control apparatus 101 in FIG. 10, this recording medium is constituted by the removable medium 221 in which the program is recorded to be distributed to a user separately from the apparatus itself such that the program is delivered thereto. This removable medium 221 includes a magnetic disk (including a flexible disk) and an optical disc (including a CD-ROM and a DVD). Furthermore, a magneto-optical disk (including a mini disc (MD)) and a semiconductor memory are also included therein. In that case, for example, this program stored in the removable medium 221 can be read and installed to the storage unit 213 by mounting this removable medium 221 to the drive 215.

In addition, for example, in the case of the projection imaging apparatus 102 in FIG. 12, this recording medium is constituted by the removable medium 331 in which the program is recorded to be distributed to a user separately from the apparatus itself such that the program is delivered thereto. This removable medium 331 includes a magnetic disk (including a flexible disk) and an optical disc (including a CD-ROM and a DVD). Furthermore, a magneto-optical disk (including an MD) and a semiconductor memory are also included therein. In that case, for example, this program stored in the removable medium 331 can be read and installed to the storage unit 323 by mounting this removable medium 331 to the drive 365.

In addition, this program can be also provided via a wired or wireless transmission medium such as a local area network, the Internet, or digital satellite broadcasting. For example, in the case of the control apparatus 101 in FIG. 10, the program can be received by the communication unit 214 to be installed to the storage unit 213. Meanwhile, for example, in the case of the projection imaging apparatus 102 in FIG. 12, the program can be received by the communication unit 324 to be installed to the storage unit 323.

As an alternative manner, this program also can be installed to a storage unit, a ROM, or the like in advance. For example, in the case of the control apparatus 101 in FIG. 10, the program also can be installed in advance to the storage unit 213, a ROM (not illustrated) built in the control unit 201, or the like. Meanwhile, for example, in the case of the projection imaging apparatus 102 in FIG. 12, the program also can be installed in advance to the storage unit 323, a ROM (not illustrated) built in the control unit 311, or the like.

Note that, the program executed by a computer may be a program in which the items of processing are performed along the time series in accordance with the order described in the present description, or alternatively, may be a program in which the items of processing are performed in parallel or at a necessary timing, for example, when called.

In addition, in the present description, steps describing the program to be recorded in a recording medium off course include processing performed along the time series in accordance with the order in which the steps are described and additionally include processing not necessarily processed along the time series but executed in a parallel manner or individually.

Furthermore, the processing by the aforementioned respective steps can be executed by the aforementioned respective apparatuses or any apparatus other than the aforementioned respective apparatuses. In that case, this apparatus which is to execute the processing is simply configured to have a function required to execute that aforementioned processing (e.g., a functional block). In addition, information required for the processing can be configured to be transmitted to that apparatus as appropriate.

<Others>

Meanwhile, in the present description, the system refers to a collection of a plurality of constituent members (e.g., apparatuses and modules (components)) and whether all the constituent members are arranged within the same cabinet is not regarded as important. Therefore, a plurality of apparatuses accommodated in separate cabinets so as to be connected to one another via a network and one apparatus of which a plurality of modules is accommodated within one cabinet are both deemed as systems.

Additionally, in the aforementioned cases, a configuration described as one apparatus (or a processing unit) may be divided so as to be configured as a plurality of apparatuses (or processing units). Or conversely, in the aforementioned cases, a configuration described as a plurality of apparatuses (or processing units) may be integrated so as to be configured as one apparatus (or a processing unit). In addition, as a matter of course, a configuration other than those described above may be employed to be added to the configurations of the respective apparatuses (or the respective processing units). Furthermore, a portion of a certain apparatus (or a certain processing unit) may be configured to be included in the configuration of another apparatus (or another processing unit) as long as the configuration or the action of the system as a whole is maintained substantially unchanged.

The favorable embodiments of the present disclosure have been described in detail thus far with reference to the accompanying drawings. However, the technological scope of the present disclosure is not limited to these examples. It is clear that a person with average knowledge on the technological field of the present disclosure can arrive at various variations or modifications within a range of the technological spirit disclosed in claims and as a matter of course, these are comprehended as part of the technological scope of the present disclosure.

For example, the present technology can employ a cloud computing configuration in which one function is divided and allocated to a plurality of apparatuses so as to be processed in coordination thereamong via a network.

Furthermore, the respective steps described in the aforementioned flowcharts can be executed by a plurality of apparatuses each taking a share thereof as well as executed by a single apparatus.

Additionally, in a case where a plurality of items of processing is included in one step, the plurality of items of processing included in one step can be executed by a plurality of apparatuses each taking a share thereof as well as executed by a single apparatus.

Meanwhile, the present technology is not limited thereto and can be also carried out as any configuration equipped in the apparatus described above or an apparatus constituting the system described above, for example, a processor serving as system large scale integration (LSI) or the like, a module using a plurality of processors or the like, a unit using a plurality of modules or the like, a set in which another function is further added to a unit, or the like (that is, a partial configuration of an apparatus).

Note that the present technology can be also configured as described below.

(1) An information processing apparatus including:

a corresponding point detection unit that detects, in regard to projection imaging apparatuses each having a projection unit that projects an image on a projection surface and an imaging unit that images the projection surface, a corresponding point between a pixel of the projection unit and a pixel of the imaging unit for a relation between one of the projection imaging apparatuses whose posture has changed and one of the projection imaging apparatuses whose posture has not changed; and a relative posture estimation unit that estimates a relative posture of the projection imaging apparatus whose posture has changed with respect to the projection imaging apparatus whose posture has not changed on the basis of the corresponding point between a pixel of the projection unit and a pixel of the imaging unit detected by the corresponding point detection unit for a relation between the projection imaging apparatus whose posture has changed and the projection imaging apparatus whose posture has not changed.

(2) The information processing apparatus according to (1), in which the corresponding point detection unit detects a corresponding point between a pixel of the projection unit of the projection imaging apparatus whose posture has not changed and a pixel of the imaging unit of the projection imaging apparatus whose posture has changed.

(3) The information processing apparatus according to (1) or (2), in which the corresponding point detection unit detects a corresponding point between a pixel of the projection unit of the projection imaging apparatus whose posture has changed and a pixel of the imaging unit of the projection imaging apparatus whose posture has not changed.

(4) The information processing apparatus according to any one of (1) to (3), further including:

a corresponding point change detection unit that detects a change in a corresponding point between a pixel of the projection unit and a pixel of the imaging unit of the projection imaging apparatuses;

a posture change detection unit that detects a posture change in each projection imaging apparatus on the basis of a sensor output from a sensor unit which is included in each projection imaging apparatus and detects at least one of a position and a direction; and a change determination unit that determines whether a posture of each projection imaging apparatus has changed on the basis of a detection result of the corresponding point change detection unit and a detection result of the posture change detection unit, in which the corresponding point detection unit is configured to detect the corresponding point between one of the projection imaging apparatuses whose posture is determined by the change determination unit to have changed and one of the projection imaging apparatuses whose posture is determined by the change determination unit to have not changed, and the relative posture estimation unit is configured to estimate a relative posture of the projection imaging apparatus whose posture is determined by the change determination unit to have changed with respect to the projection imaging apparatus whose posture is determined by the change determination unit to have not changed.

(5) The information processing apparatus according to any one of (1) to (4), in which the corresponding point detection unit is configured to further detect a corresponding point between a pixel of the projection unit and a pixel of the imaging unit of the projection imaging apparatus whose posture has changed, the information processing apparatus further including a projection surface shape estimation unit that estimates a shape of the projection surface on the basis of the corresponding point detected by the corresponding point detection unit for a relation between a pixel of the projection unit and a pixel of the imaging unit of the projection imaging apparatus whose posture has changed.

(6) The information processing apparatus according to any one of (1) to (5), in which the corresponding point detection unit is configured to further detect a corresponding point between a pixel of the projection unit and a pixel of the imaging unit of the projection imaging apparatus whose posture has not changed, the information processing apparatus further including a projection surface shape estimation unit that estimates a shape of the projection surface on the basis of the corresponding point detected by the corresponding point detection unit for a relation between a pixel of the projection unit and a pixel of the imaging unit of the projection imaging apparatus whose posture has not changed.

(7) The information processing apparatus according to (5) or (6), in which the projection surface shape estimation unit estimates a shape of the projection surface for a part of the projection surface whose shape is unknown within a range on which an image is projected by the projection unit of the projection imaging apparatus whose posture has changed.

(8) An information processing method configured to:

detect, in regard to projection imaging apparatuses each having a projection unit that projects an image on a projection surface and an imaging unit that images the projection surface, a corresponding point between a pixel of the projection unit and a pixel of the imaging unit for a relation between one of the projection imaging apparatuses whose posture has changed and one of the projection imaging apparatuses whose posture has not changed; and estimate a relative posture of the projection imaging apparatus whose posture has changed with respect to the projection imaging apparatus whose posture has not changed on the basis of the corresponding point between a pixel of the projection unit and a pixel of the imaging unit detected for a relation between the projection imaging apparatus whose posture has changed and the projection imaging apparatus whose posture has not changed.

(9) An information processing apparatus including:
a corresponding point detection unit that detects, in regard to a projection imaging apparatus having a projection unit that projects an image on a projection surface and an imaging unit that images the projection surface, a corresponding point between a pixel of the projection unit and a pixel of the imaging unit of the projection imaging apparatus whose posture has not changed; and
a projection surface shape estimation unit that estimates a shape of the projection surface on the basis of the corresponding point detected by the corresponding point detection unit for a relation between a pixel of the projection unit and a pixel of the imaging unit of the projection imaging apparatus whose posture has not changed.

(10) The information processing apparatus according to (9), in which
the projection surface shape estimation unit estimates a shape of the projection surface for a part of the projection surface whose shape is unknown.

(11) An information processing method configured to:
detect, in regard to a projection imaging apparatus having a projection unit that projects an image on a projection surface and an imaging unit that images the projection surface, a corresponding point between a pixel of the projection unit and a pixel of the imaging unit of the projection imaging apparatus whose posture has not changed; and
estimate a shape of the projection surface on the basis of the corresponding point detected for a relation between a pixel of the projection unit and a pixel of the imaging unit of the projection imaging apparatus whose posture has not changed.

(12) A projection imaging apparatus including:
a projection unit that projects an image on a projection surface;
an imaging unit that images the projection surface; a sensor unit that detects at least one of a position and a direction;
a determination unit that determines whether a posture has changed on the basis of a sensor output from the sensor unit;
a corresponding point detection unit that detects, in a case where the determination unit determines that the posture has changed, a corresponding point between a pixel of the projection unit and a pixel of the imaging unit for a relation with another projection imaging apparatus which includes the projection unit, the imaging unit, and the sensor unit and whose posture has not changed; and
a relative posture estimation unit that estimates a relative posture with respect to the another projection imaging apparatus on the basis of the corresponding point detected by the corresponding point detection unit.

(13) The projection imaging apparatus according to (12), in which
the corresponding point detection unit detects a corresponding point between a pixel of the projection unit of the another projection imaging apparatus and a pixel of the own imaging unit of the projection imaging apparatus.

(14) The projection imaging apparatus according to (12) or (13), in which
the corresponding point detection unit detects a corresponding point between a pixel of the own projection unit of the projection imaging apparatus and a pixel of the imaging unit of the another projection imaging apparatus.

(15) The projection imaging apparatus according to any one of (12) to (14), further including:
a corresponding point change detection unit that detects a change in a corresponding point between a pixel of the own projection unit and a pixel of the own imaging unit of the projection imaging apparatus; and
a posture change detection unit that detects an own posture change in the projection imaging apparatus on the basis of a sensor output from the sensor unit, in which
the determination unit is configured to determine whether an own posture of the projection imaging apparatus has changed on the basis of a detection result of the corresponding point change detection unit and a detection result of the posture change detection unit.

(16) The projection imaging apparatus according to any one of (12) to (15), in which
the corresponding point detection unit is configured to further detect a corresponding point between a pixel of the own projection unit and a pixel of the own imaging unit of the projection imaging apparatus,
the projection imaging apparatus further including a projection surface shape estimation unit that estimates a shape of the projection surface on the basis of the corresponding point detected by the corresponding point detection unit for a relation between a pixel of the own projection unit and a pixel of the own imaging unit of the projection imaging apparatus.

(17) The projection imaging apparatus according to (16), in which
the projection surface shape estimation unit estimates a shape of the projection surface for a part of the projection surface whose shape is unknown within a range on which an image is projected by the own projection unit of the projection imaging apparatus.

(18) An information processing method for a projection imaging apparatus including a projection unit that projects an image on a projection surface; an imaging unit that images the projection surface; and a sensor unit that detects at least one of a position and a direction,
the information processing method being configured to:
determine whether a posture has changed on the basis of a sensor output from the sensor unit;
detect, in a case where the posture is determined to have changed, a corresponding point between a pixel of the projection unit and a pixel of the imaging unit for a relation with another projection imaging apparatus which includes the projection unit, the imaging unit, and the sensor unit and whose posture has not changed; and
estimate a relative posture with respect to the another projection imaging apparatus on the basis of the detected corresponding point.

(19) A projection imaging apparatus including:
a projection unit that projects an image on a projection surface;
an imaging unit that images the projection surface; a sensor unit that detects at least one of a position and a direction;
a determination unit that determines whether a posture has changed on the basis of a sensor output from the sensor unit;
a corresponding point detection unit that detects, in a case where the determination unit determines that the posture has not changed, a corresponding point between a pixel of the own projection unit and a pixel of the own imaging unit of the projection imaging apparatus; and a projection surface shape estimation unit that estimates a shape of the projection surface on the basis of the corresponding point detected by the corresponding point detection unit.

(20) An information processing method for a projection imaging apparatus including a projection unit that projects an image on a projection surface; an imaging unit that images the projection surface; and a sensor unit that detects at least one of a position and a direction, the information processing method being configured to:
determine whether a posture has changed on the basis of a sensor output from the sensor unit;
detect, in a case where the posture is determined to have not changed, a corresponding point between a pixel of the own projection unit and a pixel of the own imaging unit of the projection imaging apparatus; and
estimate a shape of the projection surface on the basis of the detected corresponding point.

REFERENCE SIGNS LIST

100 Projection imaging system
101 Control apparatus
102 Projection imaging apparatus
103 Communication cable
104 Projection surface
105 Projection image
106 Input image
107 Corrected projection image
111 Projection unit
112 Imaging unit
121 Three-dimensional object
201 Control unit
231 Processing control unit
232 Projection control unit
233 Imaging control unit
234 Sensor control unit
235 Image projection unit
236 Corresponding point change detection unit
237 Sensor information change detection unit
238 Change determination unit
239 Corresponding point detection unit
240 Posture estimation unit
241 Projection surface shape estimation unit
242 Correction information update unit
301 Projection port
302 Imaging port
303 Battery
311 Control unit
312 Sensor unit
400 Projection imaging system
410 Projection imaging system
411 Projection imaging apparatus
412 Projection imaging apparatus
413 Projection imaging apparatus
414 Network

The invention claimed is:

1. An information processing apparatus comprising:
a circuitry configured to:
detect a corresponding point between a pixel of a projection unit and a pixel of an imaging unit for a relation between one of projection imaging apparatuses whose posture has changed and one of projection imaging apparatuses whose posture has not changed; and
estimate a relative posture of the projection imaging apparatus whose posture has changed with respect to the projection imaging apparatus whose posture has not changed based on the corresponding point,
wherein the circuitry detects a corresponding point between a pixel of the projection unit of the projection imaging apparatus whose posture has not changed and a pixel of the imaging unit of the projection imaging apparatus whose posture has changed.

2. An information processing apparatus comprising:
a circuitry configured to:
detect a corresponding point between a pixel of a projection unit and a pixel of an imaging unit for a relation between one of projection imaging apparatuses whose posture has changed and one of projection imaging apparatuses whose posture has not changed;
estimate a relative posture of the projection imaging apparatus whose posture has changed with respect to the projection imaging apparatus whose posture has not changed based on the corresponding point;
detect a change in a corresponding point between a pixel of the projection unit and a pixel of the imaging unit of the projection imaging apparatuses;
detect a posture change in each projection imaging apparatus on the basis of a sensor output from a sensor unit which is included in each projection imaging apparatus and detects at least one of a position and a direction; and
determine whether a posture of each projection imaging apparatus has changed on the basis of a detection result of the change in the corresponding point and a detection result of the change in each projection imaging apparatus, wherein
the corresponding point is detected between one of the projection imaging apparatuses whose posture is determined to have changed and one of the projection imaging apparatuses whose posture is determined to have not changed, and
a relative posture is estimated of the projection imaging apparatus whose posture is determined to have changed with respect to the projection imaging apparatus whose posture is determined to have not changed.

3. An information processing apparatus comprising:
a circuitry configured to:
detect a corresponding point between a pixel of a projection unit and a pixel of an imaging unit for a relation between one of projection imaging apparatuses whose posture has changed and one of projection imaging apparatuses whose posture has not changed;
estimate a relative posture of the projection imaging apparatus whose posture has changed with respect to the projection imaging apparatus whose posture has not changed based on the corresponding point;
detect a corresponding point between a pixel of the projection unit and a pixel of the imaging unit of the projection imaging apparatus whose posture has changed; and
estimate a shape of the projection surface on the basis of the detected corresponding point for a relation between a pixel of the projection unit and a pixel of the imaging unit of the projection imaging apparatus whose posture has changed.

4. The information processing apparatus according to claim 3, wherein
the circuitry estimates a shape of the projection surface for a part of the projection surface whose shape is unknown within a range on which an image is projected by the projection unit of the projection imaging apparatus whose posture has changed.

5. An information processing apparatus comprising:
a circuitry configured to:
detect a corresponding point between a pixel of a projection unit and a pixel of an imaging unit for a relation between one of projection imaging apparatuses whose posture has changed and one of projection imaging apparatuses whose posture has not changed;
estimate a relative posture of the projection imaging apparatus whose posture has changed with respect to the projection imaging apparatus whose posture has not changed based on the corresponding point;
detect a corresponding point between a pixel of the projection unit and a pixel of the imaging unit of the projection imaging apparatus whose posture has not changed; and
estimate a shape of the projection surface on the basis of the detected corresponding point for a relation between a pixel of the projection unit and a pixel of the imaging unit of the projection imaging apparatus whose posture has not changed.

6. The information processing apparatus according to claim 5, wherein
the circuitry estimates a shape of the projection surface for a part of the projection surface whose shape is unknown within a range on which an image is projected by the projection unit of the projection imaging apparatus whose posture has changed.

7. An information processing method comprising:
detecting a corresponding point between a pixel of a projection unit and a pixel of an imaging unit for a relation between one of projection imaging apparatuses whose posture has changed and one of projection imaging apparatuses whose posture has not changed;
estimating a relative posture of the projection imaging apparatus whose posture has changed with respect to the projection imaging apparatus whose posture has not changed based on the corresponding point; and
detecting a corresponding point between a pixel of the projection unit of the projection imaging apparatus whose posture has not changed and a pixel of the imaging unit of the projection imaging apparatus whose posture has changed.

8. An information processing method comprising:
detecting a corresponding point between a pixel of a projection unit and a pixel of an imaging unit for a relation between one of projection imaging apparatuses whose posture has changed and one of projection imaging apparatuses whose posture has not changed;
estimating a relative posture of the projection imaging apparatus whose posture has changed with respect to the projection imaging apparatus whose posture has not changed based on the corresponding point;
detecting a change in a corresponding point between a pixel of the projection unit and a pixel of the imaging unit of the projection imaging apparatuses;
detecting a posture change in each projection imaging apparatus on the basis of a sensor output from a sensor unit which is included in each projection imaging apparatus and detecting at least one of a position and a direction; and
determining whether a posture of each projection imaging apparatus has changed on the basis of a detection result of the change in the corresponding point and a detection result of the change in each projection imaging apparatus, wherein
the corresponding point is detected between one of the projection imaging apparatuses whose posture is determined to have changed and one of the projection imaging apparatuses whose posture is determined to have not changed, and
a relative posture is estimated of the projection imaging apparatus whose posture is determined to have changed with respect to the projection imaging apparatus whose posture is determined to have not changed.

9. An information processing method comprising:
detecting a corresponding point between a pixel of a projection unit and a pixel of an imaging unit for a relation between one of projection imaging apparatuses whose posture has changed and one of projection imaging apparatuses whose posture has not changed;
estimating a relative posture of the projection imaging apparatus whose posture has changed with respect to the projection imaging apparatus whose posture has not changed based on the corresponding point;
detecting a corresponding point between a pixel of the projection unit and a pixel of the imaging unit of the projection imaging apparatus whose posture has changed; and
estimating a shape of the projection surface on the basis of the detected corresponding point for a relation between a pixel of the projection unit and a pixel of the imaging unit of the projection imaging apparatus whose posture has changed.

10. The information processing method according to claim 9, further comprising:
estimating a shape of the projection surface for a part of the projection surface whose shape is unknown within a range on which an image is projected by the projection unit of the projection imaging apparatus whose posture has changed.

11. An information processing method comprising:
detecting a corresponding point between a pixel of a projection unit and a pixel of an imaging unit for a relation between one of projection imaging apparatuses whose posture has changed and one of projection imaging apparatuses whose posture has not changed;
estimating a relative posture of the projection imaging apparatus whose posture has changed with respect to the projection imaging apparatus whose posture has not changed based on the corresponding point;
detecting a corresponding point between a pixel of the projection unit and a pixel of the imaging unit of the projection imaging apparatus whose posture has not changed; and
estimating a shape of the projection surface on the basis of the detected corresponding point for a relation between a pixel of the projection unit and a pixel of the imaging unit of the projection imaging apparatus whose posture has not changed.

12. The information processing method according to claim 11, further comprising:
estimating a shape of the projection surface for a part of the projection surface whose shape is unknown within a range on which an image is projected by the projection unit of the projection imaging apparatus whose posture has changed.

13. An information processing apparatus comprising:
a circuitry configured to:
- detect a corresponding point between a pixel of a projection unit and a pixel of an imaging unit of a projection imaging apparatus whose posture has not changed during the projection of the image; and
- estimate a shape of only a portion of a projection surface that extends outside of an initial projection range of the projection surface, the portion of the projection surface being smaller than a total surface of the projection surface and whose shape is unknown within a range on which the image is projected, based on the corresponding point.

14. The information processing apparatus according to claim 13, wherein
the initial projection range of the projection surface comprises those portions of the projection surface upon which one or more images have been projected thereon from a plurality of projection imaging apparatuses prior to a change in posture of one projection imaging apparatus of the plurality of projection imaging apparatuses.

15. An information processing method comprising:
- detecting a corresponding point between a pixel of a projection unit and a pixel of an imaging unit of a projection imaging apparatus whose posture has not changed during the projection of the image; and
- estimating a shape of only a portion of a projection surface that extends outside of an initial projection range of the projection surface, the portion of the projection surface being smaller than a total surface of the projection surface and whose shape is unknown within a range on which the image is projected, based on the corresponding point.

16. The information processing method according to claim 15, wherein
the initial projection range of the projection surface comprises those portions of the projection surface upon which one or more images have been projected thereon from a plurality of projection imaging apparatuses prior to a change in posture of one projection imaging apparatus of the plurality of projection imaging apparatuses.

* * * * *